(12) United States Patent
Hijikata

(10) Patent No.: US 9,614,471 B2
(45) Date of Patent: Apr. 4, 2017

(54) MOTOR CONTROLLER AND METHOD FOR CONTROLLING MOTOR

(71) Applicant: MINEBEA CO., LTD., Kitasaku-gun, Nagano (JP)

(72) Inventor: Hidetoshi Hijikata, Hamamatsu (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 15/132,746

(22) Filed: Apr. 19, 2016

(65) Prior Publication Data

US 2016/0352272 A1   Dec. 1, 2016

(30) Foreign Application Priority Data

May 27, 2015   (JP) ................... 2015-106937

(51) Int. Cl.
*H02P 6/00*   (2016.01)
*H02P 8/16*   (2006.01)

(52) U.S. Cl.
CPC ........................... *H02P 8/16* (2013.01)

(58) Field of Classification Search
USPC .......... 318/400.29, 695, 696, 400.27, 400.35
See application file for complete search history.

(56) References Cited

U.S. PATENT DOCUMENTS

| 8,723,463 | B2* | 5/2014 | Lin | H02P 6/085 |
| | | | | 318/400.01 |
| 9,236,829 | B2* | 1/2016 | Sugie | H02P 29/00 |
| 9,263,968 | B2* | 2/2016 | Potts | H02M 3/33584 |
| 9,397,597 | B2* | 7/2016 | Qu | H02P 8/12 |

FOREIGN PATENT DOCUMENTS

JP   H10-080194 A   3/1998

* cited by examiner

*Primary Examiner* — Bentsu Ro
*Assistant Examiner* — Iftekhar Mustafa
(74) *Attorney, Agent, or Firm* — Carrier Blackman & Associates, P.C.; Joseph P. Carrier; William D. Blackman

(57) ABSTRACT

A controller of a motor controller operates to perform a process including: controlling the H bridge circuit to switch to the charge mode; controlling the H bridge circuit to switch to the high-dissipation mode when the zero-cross detector detects that the back electromotive force voltage of the motor coil connected to a phase of the H bridge circuit shortly before the H bridge circuit is zero-crossed; controlling the H bridge circuit to switch to the low-dissipation mode after a predetermined time has elapsed; and controlling the H bridge circuit to switch to the free mode when the voltage detector detects that the differential voltage between the motor coils connected to the H bridge circuit is lower than a predetermined voltage.

6 Claims, 13 Drawing Sheets

CHARGE MODE

HIGH-DISSIPATION MODE

LOW-DISSIPATION MODE

FREE MODE

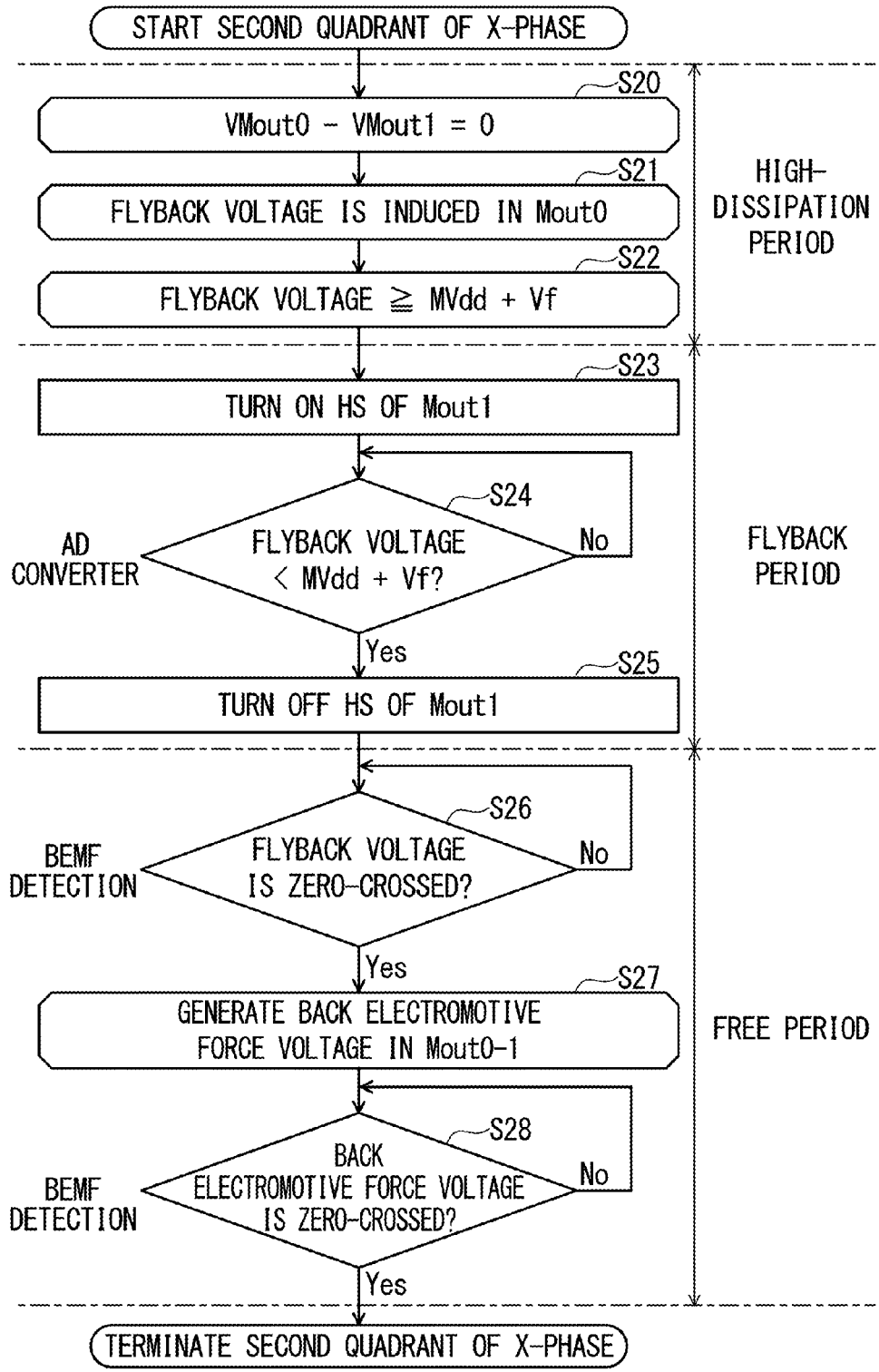

CHARGE MODE

HIGH-DISSIPATION MODE

FREE MODE

MOTOR CONTROLLER AND METHOD FOR CONTROLLING MOTOR

BACKGROUND OF THE INVENTION

1. Field of the Invention

The present invention relates to a motor controller and a method for controlling a stepping motor.

2. Description of the Related Art

A method for driving an inductive load is disclosed in JP-A-H10(1998)-080194, which combines regenerative electric current and flowing electric current to cause switching current flowing in an inductive load to be appropriate.

In paragraph 0023 of JP-A-H10-080194, it is described that "an H-bridge circuit is configured to allow current to flow in an inductive load in opposite directions, that is, in forward and reverse directions, with four semiconductor switching elements and fly-wheel diodes anti-parallel connected to the semiconductor switching elements, respectively, so that, when a current supply operation is performed to supply current from a power source to the inductive load, two of the semiconductor switching elements take a conduction state to cause current to flow in the inductive load in a desired direction, and thereby the current flowing in the inductive load is increased by such a current supply operation, with the result that, if current is equal to or greater than a predetermined reference current value, energy accumulated in the inductive load is released to control the current flowing in the inductive load."

In paragraph 0024, it is described that "then, a control may be performed by two kinds of operations: one of them is performed such that one of the semiconductor switching elements takes the conduction state to form a closed current path with the semiconductor switching element that is in the conduction state and one fly-wheel diode, by the energy accumulated in the inductive load and thereby cause current to flow in the closed current path, and the other is performed such that all of the four semiconductor switching elements are interrupted to cause current to flow in the two fly-wheel diodes by the energy accumulated in the inductive load and thereby charge power."

The former operation of causing the current to flow in the closed current path is referred to as a communication control.

Further, in paragraph 0026 of JP-A-H10(1998)-080194, it is described that "a predetermined frequency of driving cycle is made and a current supply operation is started by initiating the driving cycle, so that, if current flowing in the inductive load is equal to or greater than a predetermined value during a current supply operation, the current supply operation is terminated and energy accumulated in the inductive load is released, and, assuming that a predetermined period after the driving cycle is started is defined as a power regeneration period and a period from the end of the power regeneration period to the end of the driving cycle is defined as a current period, a power regenerating operation is performed within the power regeneration period after the current supply operation is terminated, and the communication control is performed within the current period."

A motor is rotated by driving a plurality of drive coils in opposite directions (bipolar) and changing a phase to apply current. If switching elements provided on opposite sides of the coils, namely, a motor supply voltage side (high side) and a ground side (low side) are simultaneously turned off when the motor is rotated, a high voltage of flyback pulse (kick back) is induced by energy reserved in the coils.

A coil current is maximized at the time of the phase change. If the flyback pulse is induced, the coil current is discharged to the ground by parasitic transistor effect due to a Complementary MOS (CMOS) manufacturing process of an Application Specific Integrated Circuit (ASIC), thus causing a power dissipation. Therefore, the ASIC generates heat, so that an operation is limited at high temperature.

In a period when the flyback pulse is induced, the high-side switching elements are temporarily turned on instead of turning all the switching elements off, to cause the current discharged to the ground to flow through the high-side switching elements and thereby flow back to a supply power source of the motor. In this way, it is possible to decrease a power dissipation.

However, since a period when the flyback pulse is induced varies depending on a drive voltage of the motor, a drive load of the motor and a rotating speed, it is difficult to appropriately control a flow time depending on a motor operation. Thus, a case where a time for a communication control is not optimum may occur, so that a power dissipation may undesirably occur.

For example, if the time for the communication control is shorter than a period when the flyback pulse is induced, current flowing in the switching elements flows through a fly-wheel diode connected in parallel thereto to be returned, thus causing a power dissipation. In contrast, if the time for the communication control is shorter than the period when the flyback pulse is induced, an inductive load is short-circuited to act as a brake against the rotation of the motor, so that it is further difficult to control the speed of the motor, and it is impossible to measure a back electromotive force voltage for detecting a stall of synchronism after the speed of the motor is controlled.

Further, it is possible to reduce the effect of heat generation by mounting a heat sink to an ASIC and increasing a size of a substrate and an amount of copper. However, this method is problematic in that the size of the substrate or a case as well as manufacturing cost is increased.

An external attaching diode is added to every output terminal of the motor, and thereby coil current flows back to the motor power source without being affected by the parasitic transistor effect, so that it is possible to decrease a power dissipation. However, this method is likewise problematic in that the size of the substrate as well as manufacturing cost is increased because of increases in mounting part point and mounting area.

SUMMARY OF THE INVENTION

One of objects of the present invention is to provide a motor controller and a method for controlling a stepping motor that are capable of reducing a power dissipation by returning current discharged to a ground to a power source.

According to an illustrative embodiment of the present invention, there is provided a motor controller including: an H bridge circuit having switching elements, fly-wheel diodes, and half bridges connected to motor coils provided in the motor; a voltage detector that detects a differential voltage between the motor coils; a zero-cross detector that detects a zero-cross of a back electromotive force voltage of each of the motor coils; and a controller that operates to control the H bridge circuit to operate in one of operation modes including a charge mode, a high-dissipation mode, a low-dissipation mode and a free mode by activating the switching elements of the H bridge based on the differential voltage detected by the voltage detector. The H bridge circuit increases a motor current flowing in each of the motor coils in the charge mode. The H bridge circuit operates with high energy dissipation and a flyback pulse of each of the motor coils is induced in the high-dissipation mode. The H bridge circuit operates with low energy dissipation that is lower than in the high-dissipation mode in the low-dissipation mode. The H bridge circuit operates to allow the zero-cross detector to detect the zero-cross of the back electromotive force voltage of each of the motor coils after the flyback pulse of each of the motor coils is decreased. The controller further operates to perform a process including: controlling the H bridge circuit to switch to the charge mode; controlling the H bridge circuit to switch to the high-dissipation mode when the zero-cross detector detects that the back electromotive force voltage of the motor coil connected to a phase of the H bridge circuit shortly before the H bridge circuit is zero-crossed; controlling the H bridge circuit to switch to the low-dissipation mode after a predetermined time has elapsed; and controlling the H bridge circuit to switch to the free mode when the voltage detector detects that the differential voltage between the motor coils connected to the H bridge circuit is lower than a predetermined voltage.

According to another illustrative embodiment of the present invention, there is provided a method for controlling a motor with a motor controller including: an H bridge circuit having switching elements, fly-wheel diodes, and half bridges connected to motor coils provided in the motor; a voltage detector that detects a differential voltage between the motor coils; a zero-cross detector that detects a zero-cross of a back electromotive force voltage of each of the motor coils; and a controller that operates to control the H bridge circuit to operate in one of operation modes including a charge mode, a high-dissipation mode, a low-dissipation mode and a free mode by activating the switching elements of the H bridge based on the differential voltage detected by the voltage detector. The H bridge circuit increases a motor current flowing in each of the motor coils in the charge mode. The H bridge circuit operates with high energy dissipation and a flyback pulse of each of the motor coils is induced in the high-dissipation mode. The H bridge circuit operates with low energy dissipation that is lower than in the high-dissipation mode in the low-dissipation mode. The H bridge circuit operates to allow the zero-cross detector to detect the zero-cross of the back electromotive force voltage of each of the motor coils after the flyback pulse of each of the motor coils is decreased. The method includes: controlling the H bridge circuit to switch to the charge mode; controlling the H bridge circuit to switch to the high-dissipation mode when the zero-cross detector detects that the back electromotive force voltage of the motor coil connected to a phase of the H bridge circuit shortly before the H bridge circuit is zero-crossed; controlling the H bridge circuit to switch to the low-dissipation mode after a predetermined time has elapsed; and controlling the H bridge circuit to switch to the free mode when the voltage detector detects that the differential voltage between the motor coils connected to the H bridge circuit is lower than a predetermined voltage.

BRIEF DESCRIPTION OF THE DRAWINGS

In the accompanying drawings:

FIG. 8 is a flowchart illustrating the processing of a second quadrant of the X phase of the apparatus for controlling the drive of the motor according to the first embodiment;

DETAILED DESCRIPTION

Hereinafter, embodiments of the present invention will be described in detail with reference to the accompanying drawings.

Figure 1:
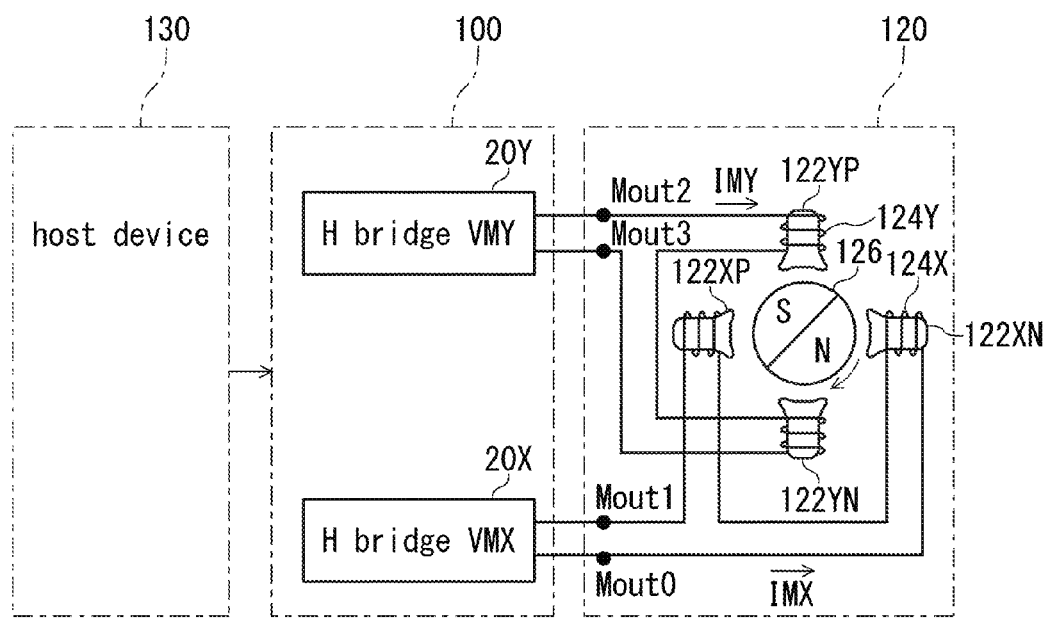
FIG. 1 is an entire block diagram illustrating a motor control system according to a first embodiment and a comparative example.

FIG. 1 shows an overall block diagram of a motor controlling system according to a first embodiment of the present invention.

In FIG. 1, a motor 120 is a bipolar two-phase stepping motor, and includes a rotor 126 that has a permanent magnet and is installed to be freely rotatable, and stators that are installed in four positions in a circumferential direction of the rotor 126. These stators are composed of stators 122XP and 122XN each having an X phase and stators 122YP and 122YN each having a Y phase. Coils are wound around the respective stators. The coils wound around the stators 122YP and 122YN are connected in series, so that both the coils are together referred to as a "coil 124Y" Likewise, the coils wound around the stators 122XP and 122XN are connected in series, so that both the coils are together referred to as a "coil 124X."

A host device 130 outputs a speed command signal for instructing a rotating speed of the motor 120. A motor controller 100 controls the drive of the motor 120 in response to the speed command signal. H-bridge circuits 20X and 20Y are installed in the motor controller 100 to apply a voltage VMX of the X phase and a voltage VMY of the Y phase to the coils 124X and 124Y, respectively.

One end of the coil 124X of the X phase is a terminal Mout0, while the other end is a terminal Mout1. The voltage VMX of the X phase is a difference between a voltage of the terminal Mout1 and a voltage of the terminal Mout0. In a coil current IMX of the X phase, a direction from the terminal Mout0 to the terminal Mout1 is set as a positive direction.

Further, one end of the coil 124Y of the Y phase is a terminal Mout2, while the other end is a terminal Mout3. The voltage VMY of the Y phase is a difference between a voltage of the terminal Mout3 and a voltage of the terminal Mout2. In a coil current IMY of the Y phase, a direction from the terminal Mout2 to the terminal Mout3 is set as a positive direction.

Figure 2:
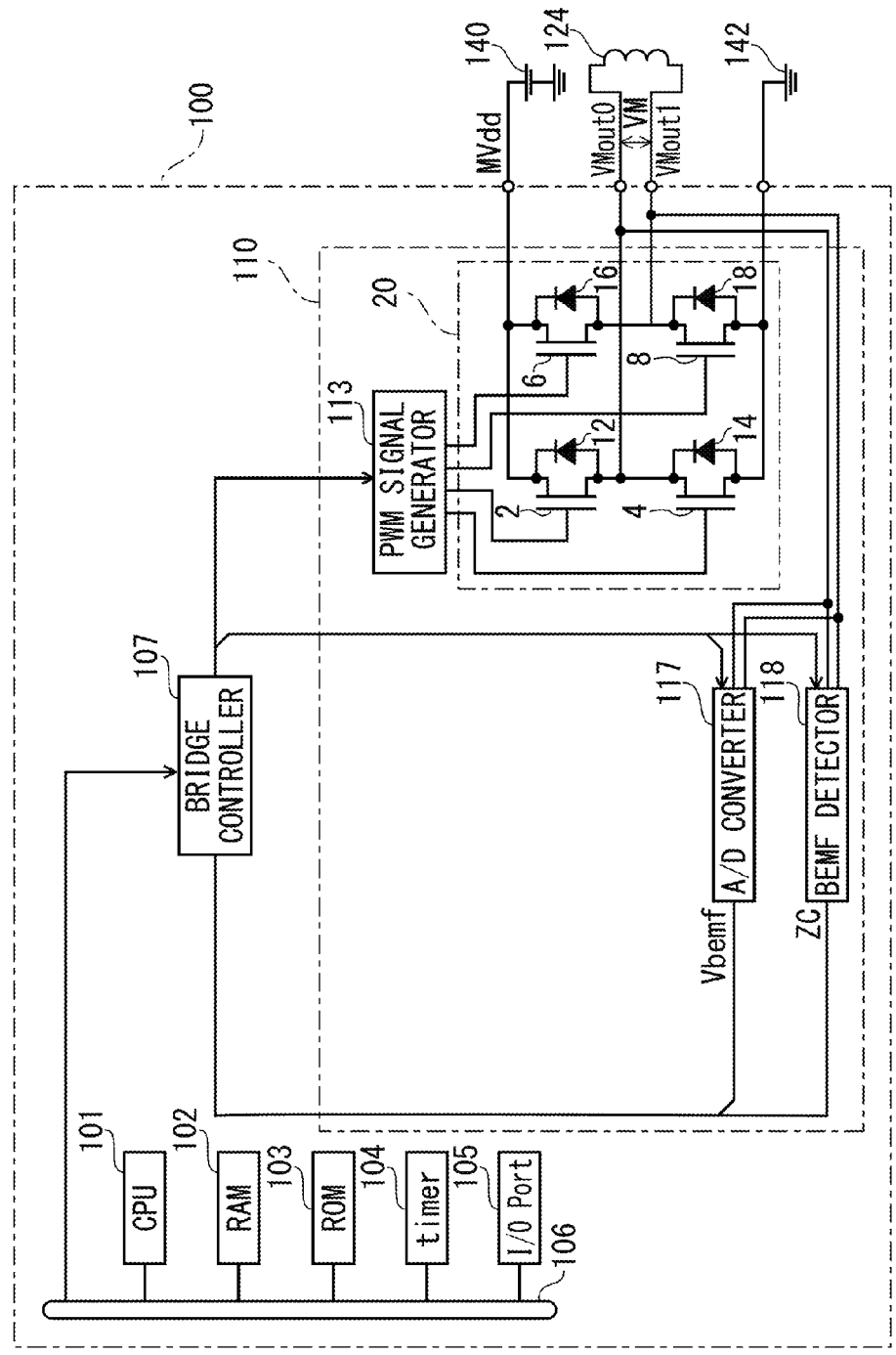
FIG. 2 is a detailed block diagram illustrating a motor controller according to the first embodiment and the comparative example.

FIG. 2 is a detailed block diagram illustrating the motor controller according to the first embodiment.

The motor controller 100 will be described in detail with reference to FIG. 2. FIG. 1 shows two systems of coils 124X and 124Y and two systems of H-bridge circuits 20X and 20Y, while FIG. 2 shows one system of coil 124 and one system of H-bridge circuit 20.

A Central Processing Unit (CPU) 101 installed in the motor controller 100 controls each part through a bus 106, based on a control program stored in a read only memory (ROM) 103. A random access memory (RAM) 102 is used as a working memory of the CPU 101. A timer 104 measures a time elapsed from a reset timing, under the control of the CPU 101. An I/O Port 105 inputs and outputs signals between the host device 130 located at the upper position in FIG. 1 and other external apparatuses. A bridge controller 107 controls each part of the bridge control circuit 110, based on a command from the CPU 101.

The bridge control circuit 110 is configured as an integral integrated circuit. A PWM signal generator 113 provided in the bridge control circuit is based on a control by the bridge controller 107, generates a PWM signal and then supplies this signal to the H-bridge circuit 20. The H-bridge circuit 20 includes switching elements 2, 4, 6 and 8 that are composed of FETs (Field-Effect Transistors). The PWM signal is an on/off signal that is applied to the switching elements 2, 4, 6 and 8 as gate voltage. In the drawing, a lower terminal of each of the switching elements 2, 4, 6 and 8 becomes a source terminal, while an upper terminal thereof becomes a drain terminal.

The switching elements 2 and 4 are connected in series, and a DC power source 140 and a ground 142 are connected to the series circuit, so that a predetermined power voltage MVdd is applied thereto. Likewise, the switching elements 6 and 8 are connected in series, so that the power voltage MVdd is applied to the series circuit. Diodes 12, 14, 16 and 18 are diodes (fly-wheel diodes) for a return current, and are connected in parallel to the switching elements 2, 4, 6 and 8.

A voltage VMout0 of a connecting point between the switching elements 2 and 4 is applied to one end of the coil 124X of the motor 120. Further, a voltage VMout1 of a connecting point between the switching elements 6 and 8 is applied to the other end of the coil 124. Thus, a motor voltage VM (=voltage VMout0−VMout1) that is equal to a difference between the voltage VMout0 and the voltage VMout1 is applied to the coil 124. The motor voltage VM is actually the voltage VMX of the X phase and the voltage VMY of the Y phase, which are illustrated in FIG. 1. Further, a voltage VMout2 is applied to the coil 124Y of the Y phase, and a voltage VMout3 is applied to the other end of the coil 124Y of the Y phase.

Further, the voltages VMout0 and VMout1 are also supplied to an A/D converter 117 and a back electromotive force voltage (BEMF) detector 118. In the first embodiment, the A/D converter 117 is used as a voltage detector to detect a differential voltage of the motor coils. The BEMF detector 118 is a zero-cross detector. When the motor voltage VM is the back electromotive force voltage, namely, in a period when no voltage is applied from the H-bridge circuit 20, a voltage direction is replaced (zero-cross) and thus a flag ZC is output. The A/D converter 117 measures and outputs the back electromotive force voltage Vbemf of the coil 124 based on the voltages VMout0 and VMout1. The back electromotive force voltage Vbemf is used for stall detection of synchronism.

Figure 9A:
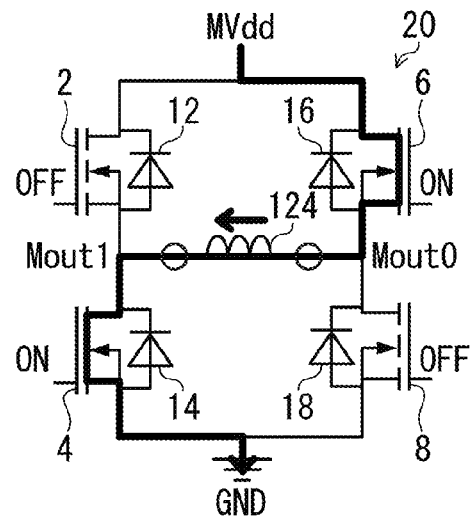
FIGS. 9A-9C are explanatory views illustrating operation modes of an H-bridge circuit according to a comparative example.
Figure 9B:
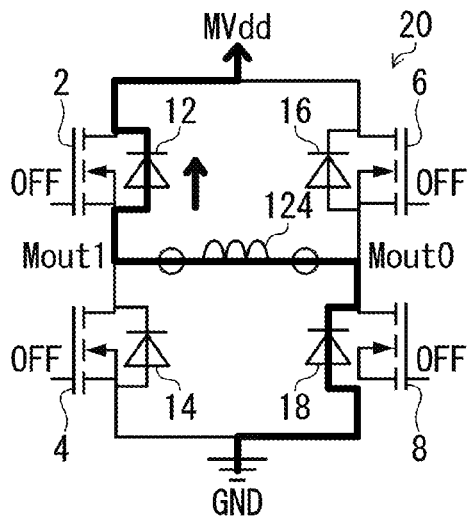
Figure 9C:
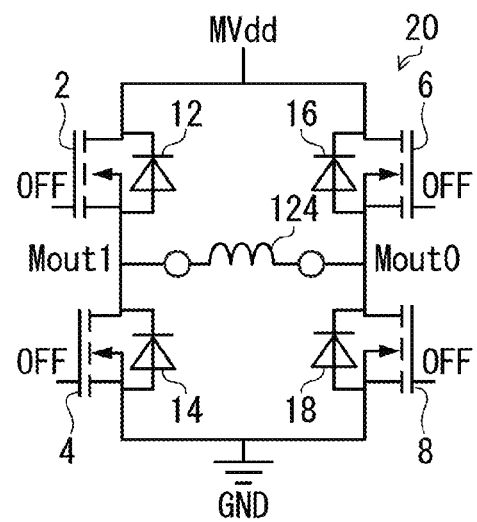

FIGS. 9A to 9C are explanatory views illustrating an operation mode of the H-bridge circuit 20 according to a comparative example.

FIG. 9A is a view showing the operation of the H-bridge circuit 20 in a current applying period.

When a motor current is applied to the coil 124, two diagonally opposing switching elements are turned on. In the illustrated example, the switching elements 4 and 6 are on, while switching element 2 and 8 are off. In this state, the motor current flows through the switching element 6, the coil 124 and the switching element 4 in a direction shown by a bold line. This operation period is referred to as a "current applying period," and this operation mode is referred to as a "charge mode."

However, even if the gate voltage of any of the switching elements is turned off, an associated switching element temporarily remains in the ON state by a parasitic capacity of the associated switching element. Hence, if the diagonally opposing switching elements 4 and 6 are changed from the ON state to the OFF state and simultaneously other diagonally opposing switching elements 2 and 8 are changed from the OFF state to the ON state, the switching elements 2 and 4 connected in series are momentarily on to be shot through. Thus, short-circuit occurs between the DC power source 140 and the ground 142, so that the switching elements 2 and 4 are broken. The same applies to the switching elements 6 and 8. In order to prevent this problem, the H-bridge circuit 20 is set as a "high-dissipation mode" of FIG. 9B, subsequent to the "charge mode."

Therefore, if the switching elements 4 and 6 are off while the switching elements 2 and 8 are off, an operation is transferred from the charge mode of FIG. 9A to the high-dissipation mode of FIG. 9B. A period when the H-bridge circuit 20 is operated in the high-dissipation mode is referred to as the "high-dissipation period."

FIG. 9B is a view showing the operation of the H-bridge circuit 20 in the high-dissipation period.

In the high-dissipation mode, the H-bridge circuit 20 turns all of the switching elements 2, 4, 6 and 8 off. At this time, current flows through the diode 18, the coil 124 and the diode 12 in a direction shown by a bold line, by energy reserved in the coil 124. That is, energy accumulated in the coil 124 causes current to flow in a closed circuit formed by the high-side diode 12 that is located in a motor-current flowing direction shown by a bold line and the low-side diode 18 that is located in a direction opposite to the motor-current flowing direction shown by a bold line. This high-dissipation mode leads to a power dissipation in response to a voltage drop Vf in the forward directions of the diodes 12 and 18. If the H-bridge circuit 20 is formed by a CMOS process, the current leaks to the ground 142 due to the parasitic transistor effect in the high-dissipation mode, thus generating heat and consequently increasing an energy dissipation.

If the coil 124 sufficiently releases energy from the high-dissipation mode of FIG. 9B, no current flows and thereby the mode is transitioned to a "free mode" of FIG. 9C.

FIG. 9C is a view illustrating an operation of the H-bridge circuit 20 in a free period.

In the free mode, the H-bridge circuit 20 turns all the switching elements 2, 4, 6 and 8 off. At this time, the energy accumulated in the coil 124 is being released. In this free mode, the back electromotive force voltage appears in the coil 124. The bridge control circuit 110 shifts to a next quadrant by detecting the zero-cross of the back electromotive force voltage of the motor 120 in the free period.

Figure 10:
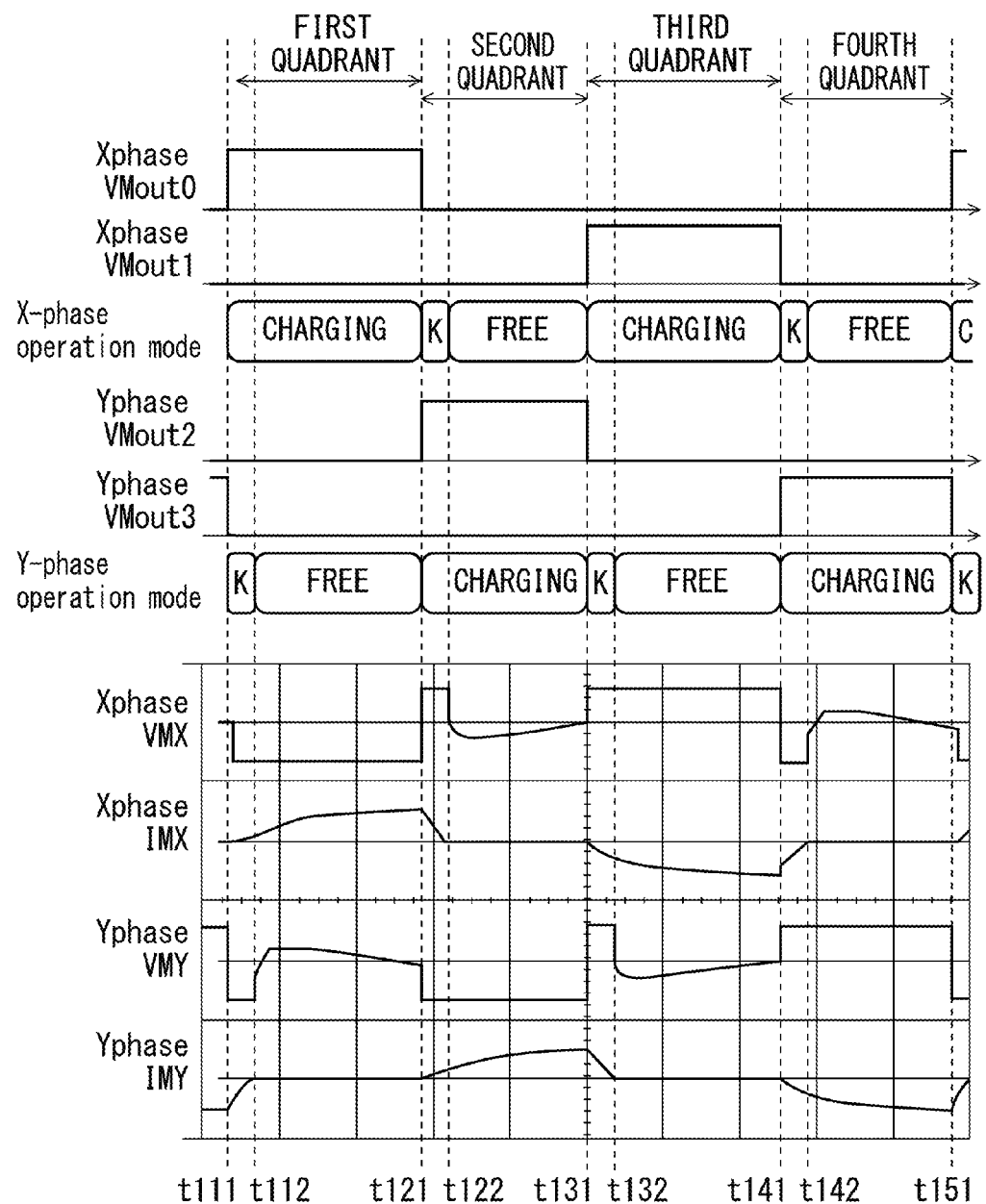
FIG. 10 is a waveform chart illustrating current sequences of an X phase and a Y phase of the H-bridge circuit according to the comparative example.

FIG. 10 is a waveform chart illustrating current sequences of the X phase and the Y phase of the H-bridge circuit 20.

The waveform chart of FIG. 10 shows the voltages VMout0 and VMout1 of the X phase, the operation mode of the X phase, the voltages VMout2 and VMout3 of the Y phase, the operation mode of the Y phase, the voltage VMX and the coil current IMX of the X phase, and the voltage VMY and the coil current IMY of the Y phase.

The motor controller 100 of the comparative example drives the motor 120 in one phase excitation in response to motor drive voltage and load. The motor 120 rotates by constituting one electrical angle with four phases (quadrants). If the X phase is the current applying period (see FIG. 9A) in any quadrant, the Y phase takes the free period (see FIG. 9C) after the high-dissipation period (see FIG. 9B).

When the motor drive voltage is high or the load is small, the rotating speed of the motor 120 is increased, the maximum current of the coil 124 is reduced. If the motor drive load is small, a flyback pulse time is shortened. The back electromotive force voltage is generated in the free period of each phase. This back electromotive force voltage is high if the motor rotating speed is fast, and becomes 0 [V] at the time of being stopped, so that it may be used to detect the stall of synchronism.

In FIG. 10, the first quadrant is a period from time t111 to time t121. In this first quadrant, the H-bridge circuit 20X of the X phase is operated in the charge mode. At this time, the high-side switching element 6 of a leg on the terminal Mout0 of the H-bridge circuit 20X and the low-side switching element 4 of a leg on the terminal Mout1 thereof are set to on-state. Thus, the terminal Mout0 conducts current to the DC power source 140 to apply the power voltage MVdd, and the terminal Mout1 conducts current to the ground 142 to become 0 [V]. The voltage VMX of the X phase becomes (−MVdd), so that the coil current IMX of the X phase flows in a direction from the terminal Mout0 to the terminal Mout1 and simultaneously an absolute value of the current is gradually increased.

In the first quadrant, all the switching elements of the H-bridge circuit 20Y of the Y phase are set to off-state, and the H-bridge circuit is operated in the high-dissipation mode from time t111 to time t112 and is operated in the free mode after time t112. In FIG. 10, the high-dissipation mode is simply designated as [K].

The voltage VMY of the Y phase becomes equal to or less than (−MVdd−2Vf) by the flyback pulse immediately after time t111 and simultaneously is clamped by the diode, so that this voltage value is continued over a predetermined period. The voltage VMY is suddenly increased shortly before time t112 to be zero-crossed and is gently reduced after reaching a predetermined voltage to be zero-crossed again in time t121. The coil current IMY of the Y phase flows in a direction from the terminal Mout3 to the terminal Mout2 immediately after time t111, but the absolute value of the current is gradually reduced to become 0 [mA] shortly before time t112 and then holds 0 [mA] until reaching time t121.

The second quadrant is a period from time t121 to time t131. In this second quadrant, all the switching elements 2, 4, 6 and 8 of the H-bridge circuit 20X of the X phase are set to off-state, and the H-bridge circuit is operated in the high-dissipation mode from time t121 to time t122 and is operated in the free mode after time t122.

The voltage VMX of the X phase becomes equal to or more than (+MVdd+2Vf) by the flyback pulse immediately after time t121 and simultaneously is clamped by the diode, so that this voltage value is continued over a predetermined period. The voltage VMX is suddenly reduced shortly before time t122 to be zero-crossed and is gently increased after being reduced to a predetermined voltage to be zero-crossed again in time t131. The coil current IMX of the X phase flows in a direction from the terminal Mout0 to the terminal Mout1 immediately after time t121, but the absolute value of the current is gradually reduced to become 0 [mA] shortly before time t122 and then holds 0 [mA] until reaching time t131.

In the second quadrant, the H-bridge circuit 20Y of the Y phase is operated in the charge mode. At this time, the high-side switching element of a leg on the terminal Mout2 of the H-bridge circuit 20Y and the low-side switching element of a leg on the terminal Mout3 thereof are set to on-state. Thus, the terminal Mout2 conducts current to the DC power source 140 to apply the power voltage MVdd, and the terminal Mout3 conducts current to the ground 142 to become 0 [V].

The voltage VMY of the Y phase applies voltage (−MVdd), so that the coil current IMY of the Y phase flows in a direction from the terminal Mout2 to the terminal Mout3 and simultaneously an absolute value of the current is gradually increased.

The third quadrant is a period from time t131 to time t141. In this third quadrant, the H-bridge circuit 20X of the X phase is operated in the charge mode. At this time, the high-side switching element 2 of the leg on the terminal Mout1 of the H-bridge circuit 20X and the low-side switching element 8 of the leg on the terminal Mout0 thereof are set to on-state. Thus, the terminal Mout1 conducts current to the DC power source 140 to apply the power voltage MVdd, and the terminal Mout0 conducts current to the ground 142 so that the applied voltage becomes 0 [V]. The voltage VMX of the X phase becomes (+MVdd), so that the coil current IMX of the X phase flows in a direction from the terminal Mout1 to the terminal Mout0 and simultaneously an absolute value of the current is gradually increased.

In this third quadrant, all the switching elements of the H-bridge circuit 20Y of the Y phase are set to off-state, and the H-bridge circuit is operated in the high-dissipation mode from time t131 to time t132 and is operated in the free mode after time t132.

The voltage VMY of the Y phase becomes equal to or more than (+MVdd+2Vf) by the flyback pulse immediately after time t131 and simultaneously is clamped by the diode, so that this voltage value is continued over a predetermined period. The voltage VMY is suddenly reduced shortly before time t132 to be zero-crossed and is gently increased after being reduced to a predetermined voltage to be zero-crossed again in time t141. The coil current IMY of the Y phase flows in a direction from the terminal Mout2 to the terminal Mout3 immediately after time t131, but the absolute value of the current is gradually reduced to become 0 [mA] shortly before time t132 and then holds 0 [mA] until reaching time t141.

The fourth quadrant is a period from time t141 to time t151. In this fourth quadrant, all the switching elements 2, 4, 6 and 8 of the H-bridge circuit 20X of the X phase are set to off-state, and the H-bridge circuit is operated in the high-dissipation mode from time t141 to time t142 and is operated in the free mode after time t142.

The voltage VMX of the X phase becomes equal to or less than (−MVdd−2Vf) by the flyback pulse immediately after time t141 and simultaneously is clamped by the diode, so that this voltage value is continued over a predetermined period. The voltage VMX is suddenly increased shortly before time t142 to be zero-crossed and is gently reduced after being increased to a predetermined voltage to be zero-crossed again in time t151. The coil current IMX of the X phase flows in a direction from the terminal Mout1 to the terminal Mout0 immediately after time t141, but the absolute value of the current is gradually reduced to become 0 [mA] shortly before time t142 and then holds 0 [mA] until reaching time t151.

In the fourth quadrant, the H-bridge circuit 20Y of the Y phase is operated in the charge mode. At this time, the high-side switching element of a leg on the terminal Mout3 of the H-bridge circuit 20Y and the low-side switching element of a leg on the terminal Mout2 thereof are set to on-state. Thus, the terminal Mout3 conducts current to the DC power source 140 to apply the power voltage MVdd, and the terminal Mout2 conducts current to the ground 142 to become 0 [V].

The voltage VMY of the Y phase applies voltage (+MVdd), so that the coil current IMY of the Y phase flows in a direction from the terminal Mout3 to the terminal Mout2 and simultaneously an absolute value of the current is gradually increased.

The motor 120 rotates while repeating waveforms from the first quadrant to the fourth quadrant. Further, the X-phase operation mode of the first quadrant is the charge mode after time t151, and is simply designated as "C" in FIG. 10.

A power dissipation $P_{on}$ of the current applying period may be calculated from the following Equation (1).

$$P_{on} = I_{rms}^2 \times (R_{dsH} + R_{dsL}) \quad (1)$$

wherein:

$P_{on}$ is a power dissipation during the current applying period;

$I_{rms}$ is an effective value of a coil current;

$R_{dsH}$ is a resistance between drain and source of the high-side switching element when the high-side switching element is turned on; and $R_{dsL}$ is a resistance between drain and source of the low-side switching element when the low-side switching element is turned on.

A power dissipation $P_{off1}$ of the high-dissipation period may be calculated from the following Equation (2), if no current returns to the DC power source 140 and all the current leaks to the ground 142 due to parasitic transistor effect.

$$P_{off1} = \left( \left( \frac{I_{peak}}{2} \times V_f \right) + \left( \frac{I_{peak}}{2} \times (MV_{dd} + V_f) \right) \right) \times D_{fly} \quad (2)$$

wherein:

$P_{off1}$ is a power dissipation during the high-dissipation period;

$I_{peak}$ is the maximum coil current;

$V_f$ is a voltage drop in forward direction of the diode; and $D_{fly}$ is a ratio of high-dissipation period for each quadrant.

In the free period, since current rarely flows in the coil 124, there is no power dissipation. In one electrical angle of the two-phase step motor, the power dissipation P may be calculated from the following Equation (3).

$$P = (P_{on} + P_{off1}) \times 4 \quad (3)$$

wherein:

P is a power dissipation for each electrical angle of the stepping motor.

As expressed in Equation (1) to (3), the power dissipation P is greatly affected by the power voltage MVdd, the coil current, and the ratio of high-dissipation period. Therefore, a large power dissipation occurs under the parasitic transistor effect.

Figure 11:
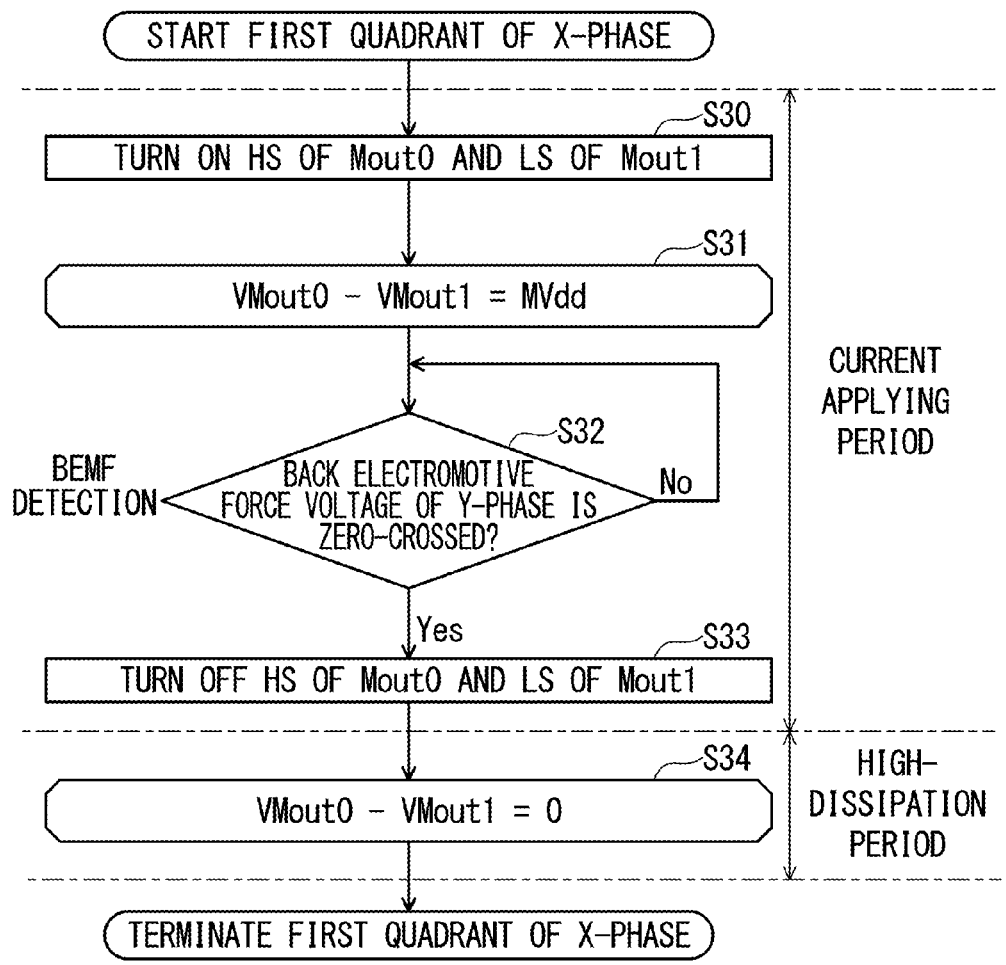
FIG. 11 is a flowchart illustrating the processing of a first quadrant of the X phase of a motor controller according to the comparative example.

FIG. 11 is a flowchart illustrating the processing of a first quadrant of the X phase of a motor controller according to the comparative example. The symbols in octagons shown in the flowchart illustrate the state of the H-bridge circuits 20X and 20Y.

The X phase starts the first quadrant from the current applying period. A bridge control circuit 110 turns on the high-side switching element 6 of the leg on the terminal Mout0 and the low-side switching element 4 of the leg on the terminal Mout1, in the H-bridge circuit 20X of the X phase (step S30). Thus, the H-bridge circuit 20X of the X phase performs current application in the first quadrant. At this time, a difference between the voltage VMout0 and the voltage VMout1 becomes the power voltage MVdd (step S31). Current flows from the terminal Mout0 to the terminal Mout1, so that the motor 120 is rotated and the absolute value of the coil current IMX is gradually increased.

Here, if the back electromotive force voltage of the Y-phase voltage VMY is zero-crossed (Yes in step S32), the high-side switching element 6 of the leg on the terminal Mout0 of the X phase and the low-side switching element 4 of the leg on the terminal Mout1 thereof are turned off (step S33), the X phase is shifted to the high-dissipation period. Thereby, the voltage VMout0 becomes equal to the voltage VMout1 (step S34), so that the first quadrant is terminated.

In the first quadrant, the H-bridge circuit 20Y of the Y phase takes a voltage waveform where the flyback voltage and the back electromotive force voltage are cancelled from each other. In an initial stage of the first quadrant, the back electromotive force voltage is generated by the rotation of the motor. However, simultaneously, because all the switching elements are turned off in a last stage of a preceding fourth quadrant, the flyback voltage is induced by the coil 124Y in a direction opposite to that of the preceding current application and then a shift to the high-dissipation period is performed. By this flyback voltage, the voltage VMout2 becomes equal to or more than the sum of the power voltage MVdd and a voltage drop Vf in the diode's forward direction, and the voltage VMout3 becomes equal to or less than the voltage drop Vf in the diode's forward direction.

Thus, a current path is formed to cause current to flow from the ground 142 through the coil 124Y back to the DC power source 140, so that the absolute value of the coil current IMY is decreased at high speed until it becomes 0 [mA] and the flyback voltage is cancelled. The H-bridge circuit 20Y of the Y phase is shifted to the free period by cancelling the flyback voltage. Therefore, the back electromotive force voltage appears between the terminal Mout2 and the terminal Mout3, by the rotation of the motor. When the back electromotive force voltage of the voltage VMY of the Y phase is zero-crossed, the step S32 is performed and the first quadrant is terminated.

Figure 12:
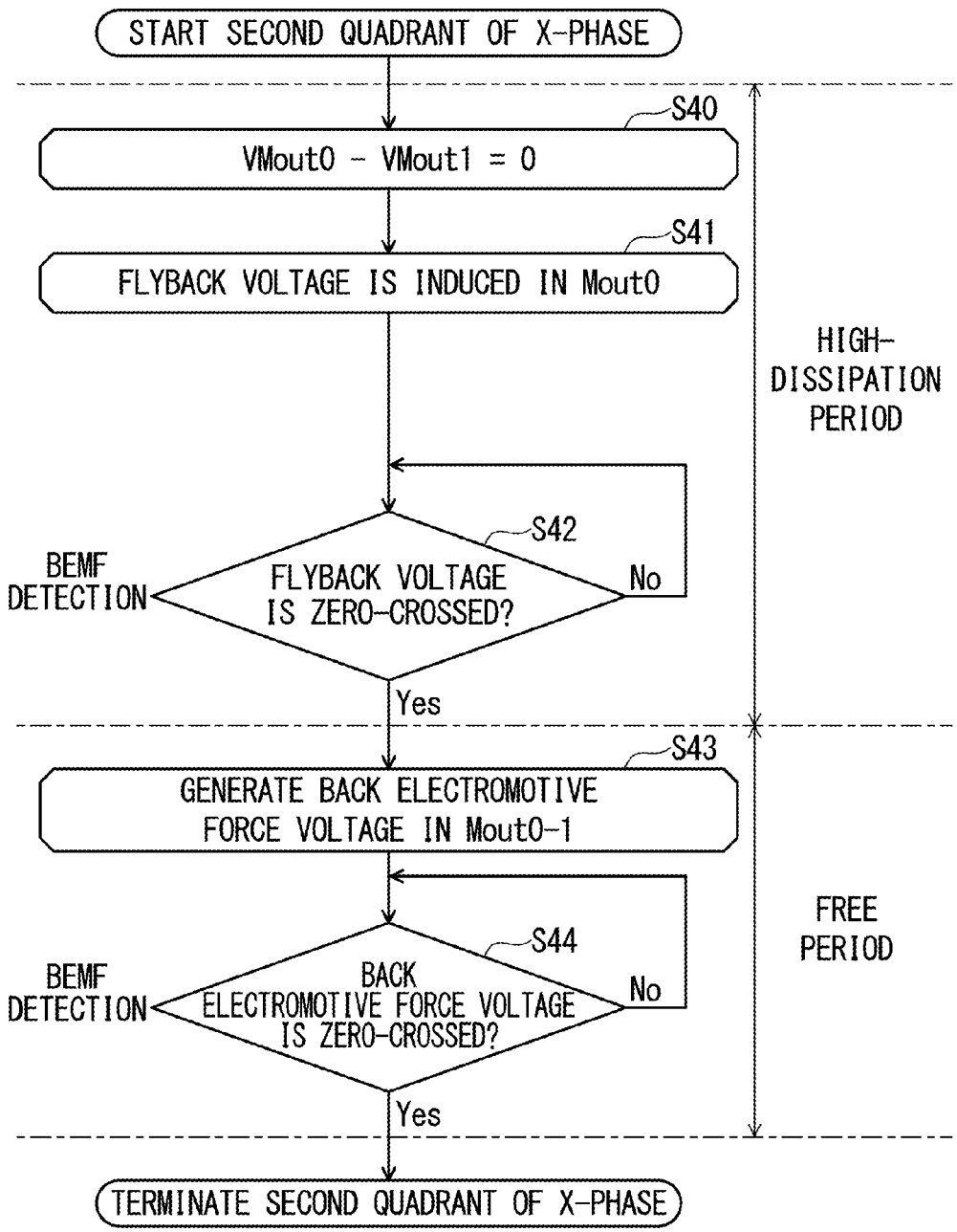
FIG. 12 is a flowchart illustrating the processing of a second quadrant of the X phase of the apparatus for controlling the drive of the motor according to the comparative example.

FIG. 12 is a flowchart illustrating the processing of a second quadrant of the X phase of the apparatus for controlling the drive of the motor according to the comparative example.

In the second quadrant, the H-bridge circuit 20X of the X phase takes a voltage waveform where the flyback voltage and the back electromotive force voltage are cancelled from each other. In an initial stage of the second quadrant, the back electromotive force voltage is generated by the rotation of the motor. However, simultaneously, because all the switching elements are turned off in the last stage of the preceding fourth quadrant, the flyback voltage is induced by the coil 124Y in a direction opposite to that of the preceding current application and then a shift to the high-dissipation period is performed.

In the initial stage of the second quadrant, the H-bridge circuit 20X of the X phase has the voltage VMout0 and the voltage VMout1 which are equal to each other (step S40). Subsequently, energy accumulated in the coil 124X is released, and the flyback voltage is induced in the terminal Mout0 (step S41).

By the flyback voltage of the X phase, the voltage VMout0 becomes equal to or more than the sum of the power voltage MVdd and the voltage drop Vf in the forward direction of the diode 12, and the voltage VMout1 becomes equal to or less than the voltage drop Vf in the forward direction of the diode 18. Thus, a current path is formed to cause current to flow from the ground 142 through the diode 18, the coil 124X and the diode 12 back to the DC power source 140, so that the absolute value of the coil current IMX is decreased at high speed until it becomes 0 [mA]. The H-bridge circuit 20X of the X phase is shifted to the free period, because the voltage VMX is zero-crossed again (Yes in step S42) by cancelling the flyback voltage.

In the free period, the back electromotive force voltage appears between the terminal Mout1 and the terminal Mout0, by the rotation of the motor. The back electromotive force voltage VMX of the X phase is zero-crossed (Yes in step S44), so that the second quadrant is terminated.

In the second quadrant, the H-bridge circuit 20Y of the Y phase performs an operation corresponding to the X-phase operation mode of FIG. 11. That is, the H-bridge circuit 20Y of the Y phase turns on the high-side switching element of the leg on the terminal Mout2 and the low-side switching element of the leg on the terminal Mout3 (corresponding to step S30 of FIG. 11) and applies current. A difference between the voltage VMout2 and the voltage VMout3 becomes the voltage MVdd (corresponding to step S31 of FIG. 11). At this time, current flows from the terminal Mout2 to the terminal Mout3, so that the motor 120 rotates and the absolute value of the coil current IMY gradually increases.

Here, if the back electromotive force voltage VMX of the X-phase is zero-crossed (corresponding to Yes in step S30 of FIG. 11), the high-side switching element of the leg on the terminal Mout2 of the Y phase and the low-side switching element of the leg on the terminal Mout3 thereof are turned off (corresponding to step S33 of FIG. 11), and the Y phase is shifted to the high-dissipation period. Thereby, the voltage VMout2 becomes equal to the voltage VMout3 (corresponding to step S34 of FIG. 11), so that the second quadrant is terminated.

FIGS. 3A to 3D are explanatory views illustrating an operation mode of the H-bridge circuit 20 according to the first embodiment.

Figure 3A:
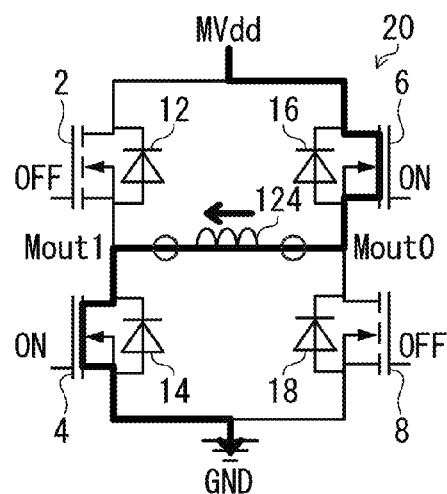
FIGS. 3A-3D are explanatory views illustrating operation modes of an H-bridge circuit according to the first embodiment.

FIG. 3A illustrates an operation of the H-bridge circuit 20 in the current applying period, which is the same as that of the H-bridge circuit 20 of FIG. 9A. The H-bridge circuit 20 is operated in the charge mode, and is shifted to the high-dissipation period of FIG. 3B in the same manner as the comparative example, after the current applying period.

Figure 3B:
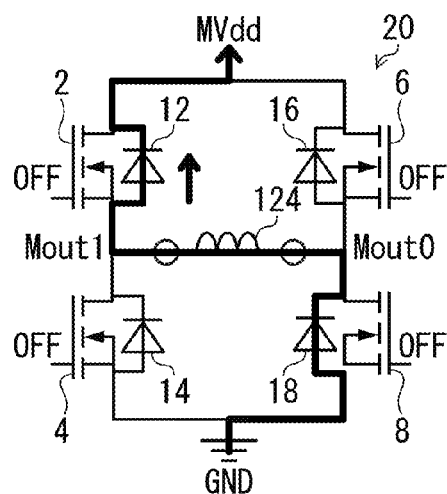

FIG. 3B illustrates an operation of the H-bridge circuit 20 in the high-dissipation period, which is the same as that of the high-dissipation mode of the H-bridge circuit 20 of FIG. 9B. The H-bridge circuit 20 of the comparative example holds the high-dissipation mode during the generation of the flyback voltage. However, the H-bridge circuit 20 of the first embodiment is configured such that, if a predetermined time has elapsed, the switching element 2 is changed from an off-state to an on-state, and consequently the H-bridge circuit is shifted to a low-dissipation mode of FIG. 3C.

Figure 3C:
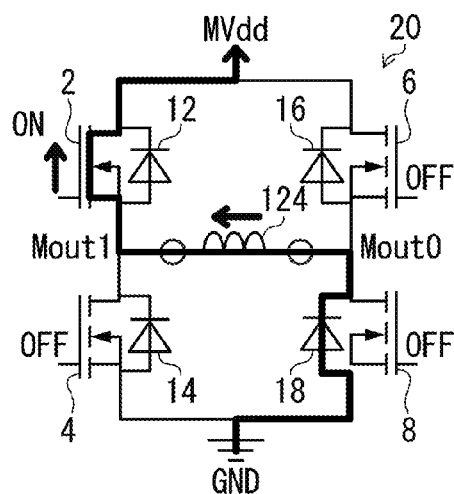

FIG. 3C illustrates an operation of the H-bridge circuit 20 in a flyback period.

By the energy accumulated in the coil 124, current flows through the diode 18, the coil 124, and the switching element 2 in a direction shown by the bold line. That is, energy accumulated in the coil 124 causes current to flow in a closed circuit formed by the high-side diode 2 that is located in a motor-current flowing direction shown by a bold line and is in the conduction state and the low-side diode 18 that is located in a direction opposite to the motor-current flowing direction to the high-side diode 2 in the conduction state shown by the bold line. In the flyback period of FIG. 3C, the power dissipation occurs only by the voltage drop Vf in the forward direction of the diode 18. Accordingly, this period is also referred to as a "low-dissipation mode" because the power dissipation during this period is lower than during the high-dissipation mode. Even if the H-bridge circuit 20 of the first embodiment is configured by the CMOS manufacturing process, there is no case where the current leaks to the ground 142 to generate heat by the parasitic transistor effect, so that it is possible to further prevent the dissipation of energy.

Figure 3D:
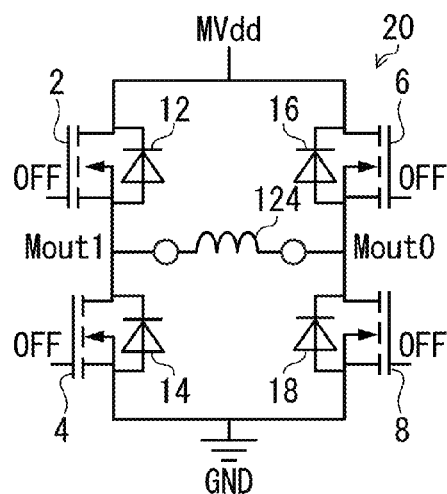

If the coil 124 sufficiently releases energy from the state of FIG. 3C, there is no current flow and thereby the shift to the state of FIG. 3D is performed. This operation period is referred to as a "free period," and this operation mode is referred to as a "free mode."

FIG. 3D is a view illustrating an operation of the H-bridge circuit 20 in the free period, which is the same as that of the H-bridge circuit 20 of FIG. 9C. In this free period, if the zero-cross of the back electromotive force voltage of the motor 120 is detected, the H-bridge circuit 20 shifts to the current applying period of FIG. 3A.

Figure 4:
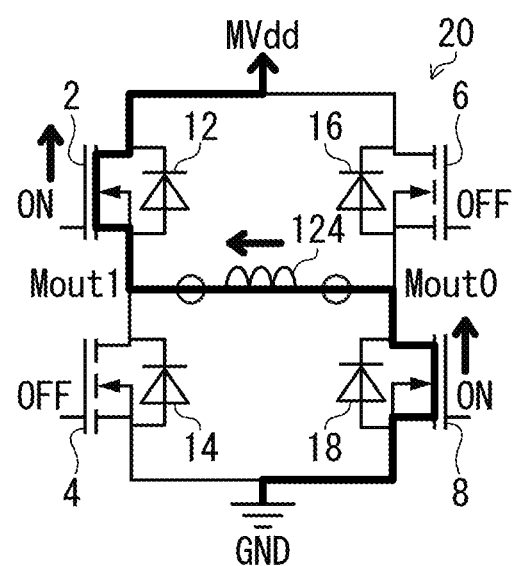
FIG. 4 is an explanatory view illustrating a low-dissipation mode of an H-bridge circuit 20 according to a variant.

FIG. 4 is an explanatory view illustrating a low-dissipation mode of an H-bridge circuit 20 according to a variant.

According to the first variant, in the low-dissipation mode of FIG. 4, a shift is performed for a predetermined period from the high-dissipation mode of FIG. 3B to the low-dissipation mode of FIG. 3C. In the low-dissipation mode of the variant shown in FIG. 4, the switching element 8 as well as the switching element 2 are changed from the off-state to the on-state. At this time, energy accumulated in the coil 124 causes current to flow through the switching element 8, the coil 124 and the switching element 2 in a direction shown by the bold line. In the flyback period of the variant, the power dissipation is further reduced as compared to the low-dissipation mode of FIG. 3C. Even if the H-bridge circuit 20 of the variant is configured by the CMOS manufacturing process, there is no case where the current leaks to the ground 142 to generate heat by the parasitic transistor effect, so that it is possible to further prevent the dissipation of energy. Further, in the second variant, the low-dissipation mode of FIG. 4 is changed and shifted to the low-dissipation mode of FIG. 3C. That is, in the second variant, the shift is performed from the high-dissipation mode of FIG. 3B to the low-dissipation mode of FIG. 4.

Figure 5:
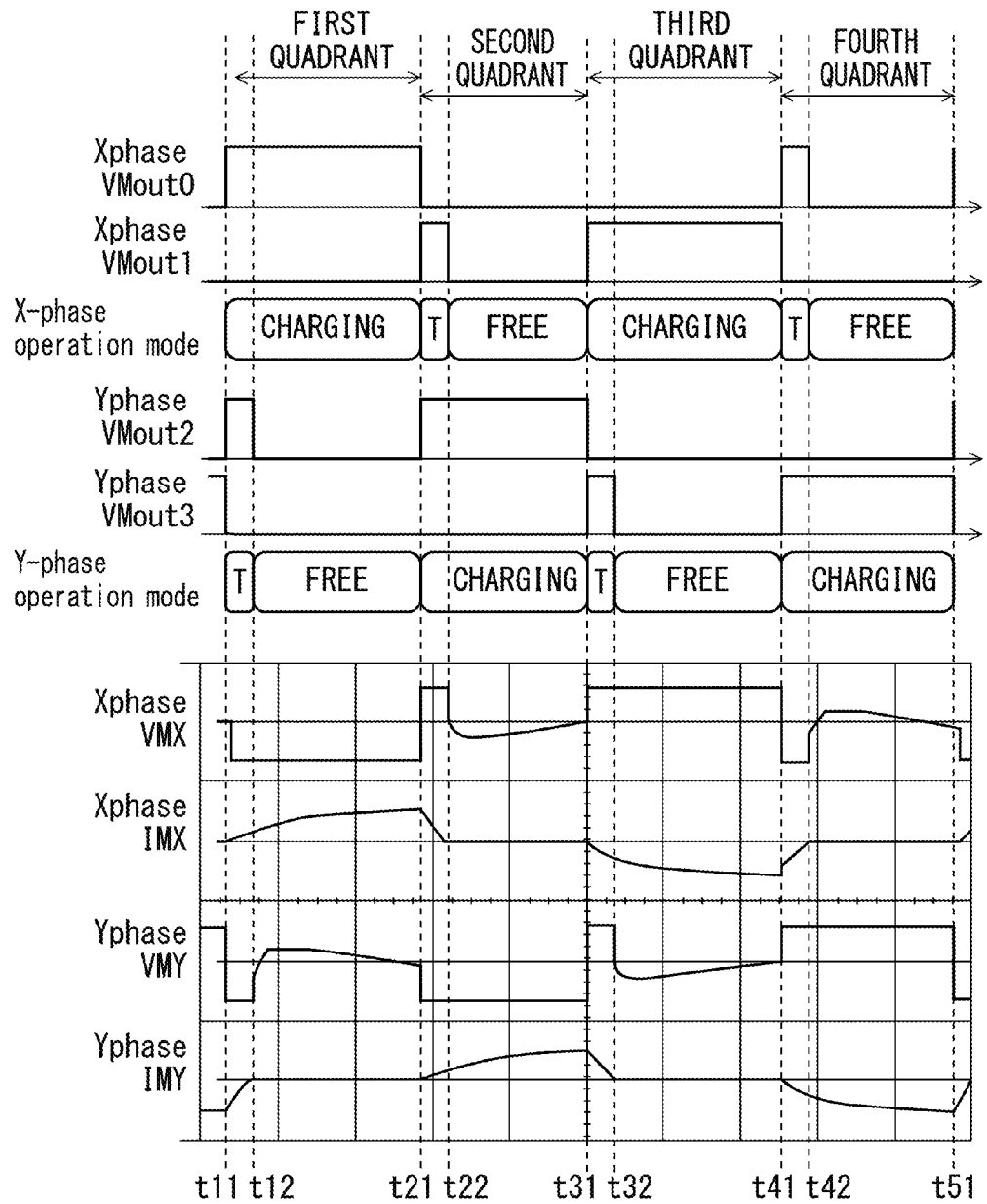
FIG. 5 is a waveform chart illustrating current sequences of an X phase and a Y phase of the H-bridge circuit.

FIG. 5 is a waveform chart illustrating current sequences of an X phase and a Y phase of the H-bridge circuit 20.

The waveform chart of FIG. 5 illustrates the X-phase voltages VMout0 and VMout1, the X-phase operation mode, the Y-phase voltages VMout2 and VMout3, the Y-phase operation mode, the X-phase voltage VMX and coil current IMX, and the Y-phase voltage VMY and coil current IMY, as in FIG. 10. Further, the X-phase voltages VMout0 and VMout1 and the Y-phase voltages VMout2 and VMout3 show schematic waveforms, and the X-phase voltage VMX and coil current IMX and the Y-phase voltage VMY and coil current IMY are shown in the waveform of an oscilloscope.

The motor controller 100 of the first embodiment drives the motor 120 in one phase excitation in response to motor drive voltage and load, as in the comparative example. The motor 120 rotates by constituting one electrical angle with four phases (quadrants). If the X phase is the current applying period (see FIG. 3A) in any quadrant, the Y phase passes through the high-dissipation period (see FIG. 3B) to become the flyback period (see FIG. 3C) and then takes the free period (see FIG. 3D).

When the motor drive voltage is high or the load is small, the rotating speed of the motor 120 is increased, the maximum current of the coil 124 is reduced. If the motor drive load is small, a flyback pulse time is shortened. The back electromotive force voltage is generated in the free period of each phase. This back electromotive force voltage is high if the motor rotating speed is fast, and becomes 0 "V] at the time of being stopped, so that it may be used to detect the stall of synchronism.

In FIG. 5, the first quadrant is a period from time t11 to time t21. In this first quadrant, the H-bridge circuit 20X of the X phase is operated in the charge mode. At this time, the high-side switching element 6 of the leg on the terminal Mout0 of the H-bridge circuit 20X and the low-side switching element 4 of the leg on the terminal Mout1 thereof are set to on-state. Thus, the terminal Mout0 conducts current to the DC power source 140 to apply the power voltage MVdd, and the terminal Mout1 conducts current to the ground 142 to become 0 [V]. The voltage VMX of the X phase becomes (−MVdd), so that the coil current IMX of the X phase flows in a direction from the terminal Mout0 to the terminal Mout1 and simultaneously an absolute value of the current is gradually increased.

In the first quadrant, all the switching elements of the H-bridge circuit 20Y of the Y phase are set to off-state, and the H-bridge circuit is operated in the high-dissipation mode in a short period of time after time t11 and then is operated in the low-dissipation mode until reaching time t12. Subsequently, the H-bridge circuit is operated in the free mode after time t12. In FIG. 5, the high-dissipation mode is omitted and the low-dissipation mode is simply designated as "T."

In the flyback period, the H-bridge circuit 20Y matches the generation of the flyback pulse with the bridge control circuit 110, turns on the high-side switching element of the leg on the terminal Mout2 where the flyback pulse is induced, and causes the current generated by this pulse to flow in the DC power source 140. Further, the bridge control circuit 110 periodically detects a flyback voltage between the terminal Mout2 and the terminal Mout3 with the A/D converter 117. Here, if the flyback voltage becomes lower than the sum of the power voltage MVdd and the voltage drop Vf in the diode's forward direction, the high-side switching element of the leg on the terminal Mout2 is turned off. This A/D converter 117 is for the purpose of detecting the stall of synchronism and is used to measure the differential voltage of the coil 124. Such a control method may optimally cope with the power dissipation depending on the operational condition, such as the power voltage MVdd or load supplied to the motor 120.

The voltage VMY of the Y phase becomes equal to or less than (−MVdd−2Vf) by the flyback pulse immediately after time t11, simultaneously is clamped by the diode and then is changed to the low-dissipation mode to become equal to or less than (−MVdd−Vf), and simultaneously is clamped by the diode, so that this voltage value is continued over a predetermined period. The voltage VMY is suddenly increased shortly before time t12 to be zero-crossed and is gently reduced after reaching a predetermined voltage to be zero-crossed again in time t21. The coil current IMY of the Y phase flows in a direction from the terminal Mout3 to the terminal Mout2 immediately after time t11, but the absolute value of the current is gradually reduced to become 0 [mA] shortly before time t12 and then holds 0 [mA] until reaching time t21.

If the turning off of the switching element is delayed when the flyback period is terminated, voltages on opposite sides of the coil are equilibrated by the power voltage MVdd supplied to the motor 120, so that the voltage waveform may be dispersed. The current I is decreased to a large extend as compared to a peak of the flyback pulse, but the power voltage MVdd supplied to the motor 120 is applied in a direction opposite to the motor driving direction to serve as a brake against the rotation of the motor. This may be realized by shortening the sampling cycle of the A/D converter 117.

The second quadrant is a period from time t21 to time t31. In this second quadrant, all the switching elements 2, 4, 6 and 8 of the H-bridge circuit 20X of the X phase are set to off-state, and the H-bridge circuit is operated in the high-dissipation mode in a short period of time after time t21 and then is operated in the low-dissipation mode until reaching time t22. Subsequently, the H-bridge circuit is operated in the free mode after time t22.

The voltage VMX of the X phase becomes equal to or more than (+MVdd+2Vf) by the flyback pulse immediately after time t21, simultaneously is clamped by the diode and then is changed to the low-dissipation mode to become equal to or more than (+MVdd+Vf), and simultaneously is clamped by the diode, so that this voltage value is continued over a predetermined period. The voltage VMX is suddenly reduced shortly before time t22 to be zero-crossed, and is gently increased after being reduced to a predetermined voltage to be zero-crossed again in time t31. The coil current IMX of the X phase flows in a direction from the terminal Mout0 to the terminal Mout1 immediately after time t21, but the absolute value of the current is gradually reduced to become 0 [mA] shortly before time t22 and then holds 0 [mA] until reaching time t31.

In the second quadrant, the H-bridge circuit 20Y of the Y phase is operated in the charge mode. At this time, the high-side switching element of the leg on the terminal Mout2 of the H-bridge circuit 20Y and the low-side switching element of the leg on the terminal Mout3 thereof are set to on-state. Thus, the terminal Mout2 conducts current to the DC power source 140 to apply the power voltage MVdd, and the terminal Mout3 conducts current to the ground 142 to become 0 [V].

The voltage VMY of the Y phase becomes the voltage (−MVdd), so that the coil current IMY of the Y phase flows in a direction from the terminal Mout2 to the terminal Mout3 and simultaneously an absolute value of the current is gradually increased.

The third quadrant is a period from time t31 to time t41. In this third quadrant, the H-bridge circuit 20X of the X phase is operated in the charge mode. At this time, the high-side switching element 2 of the leg on the terminal Mout1 of the H-bridge circuit 20X and the low-side switching element 8 of the leg on the terminal Mout0 thereof are set to on-state. Thus, the terminal Mout1 conducts current to the DC power source 140 to apply the power voltage MVdd, and the terminal Mout0 conducts current to the ground 142 so that the applied voltage becomes 0 [V]. The voltage VMX of the X phase becomes (+MVdd), so that the coil current IMX of the X phase flows in a direction from the terminal Mout1 to the terminal Mout0 and simultaneously an absolute value of the current is gradually increased.

In this third quadrant, all the switching elements of the H-bridge circuit 20Y of the Y phase are set to off-state, and the H-bridge circuit is operated in the high-dissipation mode in a short period of time after time t31 and then is operated in the low-dissipation mode until reaching time t32. Subsequently, the H-bridge circuit is operated in the free mode after time t32.

The voltage VMY of the Y phase becomes equal to or more than (+MVdd+2Vf) by the flyback pulse immediately after time t131, simultaneously is clamped by the diode and then is changed to the low-dissipation mode to become equal to or more than (+MVdd+Vf), and simultaneously is clamped by the diode, so that this voltage value is continued over a predetermined period. The voltage VMY is suddenly reduced shortly before time t32 to be zero-crossed, and is gently increased after reaching a predetermined voltage to be zero-crossed again in time t41. The coil current IMY of the Y phase flows in a direction from the terminal Mout2 to the terminal Mout3 immediately after time t31, but the absolute value of the current is gradually reduced to become 0 [mA] shortly before time t32 and then holds 0 [mA] until reaching time t41.

The fourth quadrant is a period from time t41 to time t51. In this fourth quadrant, all the switching elements 2, 4, 6 and 8 of the H-bridge circuit 20X of the X phase are set to off-state, and the H-bridge circuit is operated in the high-dissipation mode in a short period of time after time t41 and then is operated in the low-dissipation mode until reaching time t42, so that the H-bridge circuit is operated in the free mode after time t42.

The voltage VMX of the X phase becomes equal to or less than (−MVdd−2Vf) by the flyback pulse immediately after time t41, simultaneously is clamped by the diode and then is changed to the low-dissipation mode to become equal to or more than (+MVdd+Vf), and simultaneously is clamped by the diode, so that this voltage value is continued over a predetermined period. The voltage VMX is suddenly increased shortly before time t42 to be zero-crossed, and is gently reduced after reaching a predetermined voltage to be zero-crossed again in time t51. The coil current IMX of the X phase flows in a direction from the terminal Mout1 to the terminal Mout0 immediately after time t41, but the absolute value of the current is gradually reduced to become 0 [mA] shortly before time t42 and then holds 0 [mA] until reaching time t51.

In the fourth quadrant, the H-bridge circuit 20Y of the Y phase is operated in the charge mode. At this time, the high-side switching element of the leg on the terminal Mout3 of the H-bridge circuit 20Y and the low-side switching element of the leg on the terminal Mout2 thereof are set to on-state. Thus, the terminal Mout3 conducts current to the DC power source 140 to apply the power voltage MVdd, and the terminal Mout2 conducts current to the ground 142 to become 0 [V].

The voltage VMY of the Y phase becomes voltage (+MVdd), so that the coil current IMY of the Y phase flows in a direction from the terminal Mout3 to the terminal Mout2 and simultaneously an absolute value of the current is gradually increased.

The motor 120 rotates while repeating waveforms from the first quadrant to the fourth quadrant.

In the first embodiment, for example, if the X phase is the current applying period, the Y phase is shifted to the high-dissipation period, the flyback period and the free period. The power dissipation is reduced by the shift to the flyback period.

It is assumed that, in the high-dissipation mode of the first embodiment, current does not return to the DC power source 140 but all current leaks to the ground 142 by the parasitic transistor effect. In this case, the power dissipation $P_{off2}$ is represented by the following Equation (4).

$$P_{off2} = \left(\left(\frac{I_{peak}}{2} \times V_f\right) + \left(\frac{I_{peak}}{2} \times (MV_{dd} + V_f)\right)\right) \times D_{dead} \quad (4)$$

wherein:

$P_{off2}$ is a power dissipation during the high-dissipation period;

$I_{peak}$ is the maximum coil current;

$V_f$ is a voltage drop in forward direction of the diode; and $D_{dead}$ is a time ratio of high-dissipation period for each quadrant.

Since the power dissipation $P_{off3}$ of the flyback period passes through the switching element, the power dissipation is represented by the following Equation (5).

$$P_{off3} = \left(\left(\frac{I_{peak}}{2} \times V_f\right) + I_{peak}^2 \times R_{dsH}\right) \times D_{fly} \quad (5)$$

wherein:

$P_{off3}$ is a power dissipation during the flyback period;

$I_{peak}$ is the maximum coil current;

$V_f$ is a voltage drop in forward direction of the diode;

$R_{dsH}$ is a resistance between drain and source of the high-side switching element when the high-side switching element is turned on; and $D_{fly}$ is a ratio of high-dissipation period for each quadrant.

The power dissipation P of one electrical angle of the two-phase step motor is represented by the following Equation (6).

$$P = (P_{on} + P_{off2} + P_{off3}) \times 4 \quad (6)$$

wherein:

P is a power dissipation for each electrical angle of the stepping motor.

As expressed in Equation (5), since the high side in the "flyback period" passes through the switching element, the power dissipation is not affected by the power voltage MVdd and the parasitic transistor effect. Therefore, it is possible to reduce the power dissipation.

Figure 6:
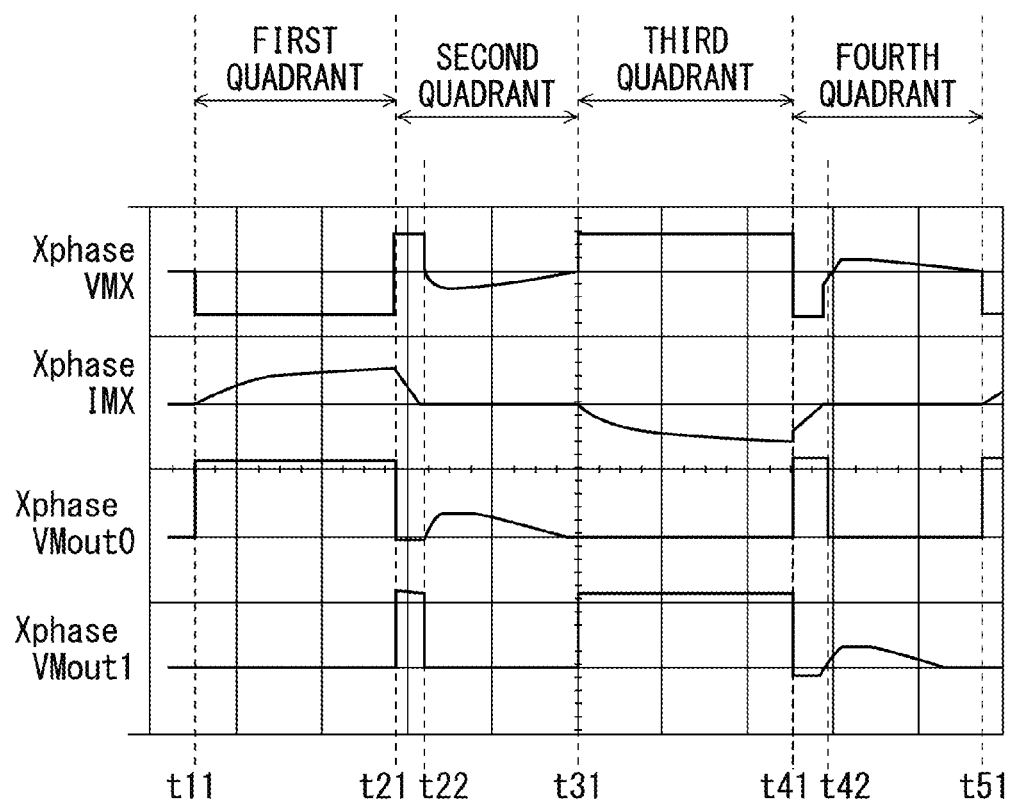
FIG. 6 is a waveform chart illustrating a voltage and a current of each part of the X phase of the H-bridge circuit.

FIG. 6 is a waveform chart illustrating a voltage and a current of each part of the X phase of the H-bridge circuit 20.

The waveform chart of FIG. 6 shows the X-phase voltage VMX and coil current IMX and the X-phase voltage VMout0 and VMout1 in the waveform of an oscilloscope.

In the first quadrant, the high-side switching element 6 of the leg on the terminal Mout0 of the H-bridge circuit 20X and the low-side switching element 4 of the leg on the terminal Mout1 thereof are set to the on-state.

The voltage VMX of the X phase becomes (−MVdd), so that the X-phase coil current IMX flows in the direction from the terminal Mout0 to the terminal Mout1 and simultaneously, the absolute value of the current is gradually increased.

Since the terminal Mout0 conducts current to the DC power source 140, the voltage VMout0 becomes (+MVdd). Since the terminal Mout1 conducts current to the ground 142, the voltage VMout1 becomes 0 [V].

In the second quadrant, all the switching elements 2, 4, 6 and 8 of the H-bridge circuit 20X are set to the off-state.

The voltage VMX of the X phase becomes equal to or more than (+MVdd+2Vf) by the flyback pulse immediately after time t21, simultaneously is clamped by the diode and then is changed to the low-dissipation mode to become equal to or more than (+MVdd+Vf), and simultaneously is clamped by the diode, so that this voltage value is continued over a predetermined period. The voltage VMX is suddenly reduced shortly before time t22 to be zero-crossed, and is gently increased after being reduced to a predetermined voltage to be zero-crossed again in time t31. The coil current IMX of the X phase flows in a (positive) direction from the terminal Mout0 to the terminal Mout1 immediately after time t21, but the absolute value of the current is gradually reduced to become 0 [mA] shortly before time t22 and then holds 0 [mA] until reaching time t31.

The voltage VMout0 of the terminal Mout0 becomes (−Vf) from time t21 to time t22, and is gently increased to a predetermined value and then reduced by the back electromotive force voltage of the motor 120 after time t22, so that the voltage becomes 0 [V] again in time t31.

The voltage VMout1 of the terminal Mout1 becomes equal to or more than the power voltage MVdd immediately after time t21, by the flyback pulse. Thereby, if a predetermined time has elapsed, the voltage becomes the power voltage MVdd. The voltage VMout1 is suddenly reduced to 0 [V] in time t22, and holds 0 [V] until reaching time t31.

In the third quadrant, the high-side switching element 2 of the leg on the terminal Mout1 of the H-bridge circuit 20X and the low-side switching element 8 of the leg on the terminal Mout0 thereof are set to the on-state.

The voltage VMX of the X phase becomes (+MVdd), so that the X-phase coil current IMX flows in the direction from the terminal Mout1 to the terminal Mout0 and simultaneously, the absolute value of the current is gradually increased.

Since the terminal Mout0 conducts current to the ground 142, the voltage VMout0 becomes 0 [V]. Since the terminal Mout1 conducts current to the DC power source 140, the voltage VMout1 becomes (+MVdd).

In the fourth quadrant, all the switching elements 2, 4, 6 and 8 of the H-bridge circuit 20X are set to the off-state.

The voltage VMX of the X phase becomes equal to or less than (−MVdd−2Vf) by the flyback pulse immediately after time t41, simultaneously is clamped by the diode and then is changed to the low-dissipation mode to become equal to or less than (−MVdd−Vf), and simultaneously is clamped by the diode, so that this voltage value is continued over a predetermined period. The voltage VMX is suddenly increased shortly before time t42 to be zero-crossed, and is gently reduced after being increased to a predetermined voltage to be zero-crossed again in time t51. The coil current IMX of the X phase flows in a (negative) direction from the terminal Mout1 to the terminal Mout0 immediately after time t41, but the absolute value of the current is gradually reduced to become 0 [mA] shortly before time t42 and then holds 0 [mA] until reaching time t51.

The voltage VMout0 of the terminal Mout0 becomes equal to or more than the power voltage MVdd immediately after time t41, by the flyback pulse. Thereby, if a predetermined time has elapsed, the voltage becomes the power voltage MVdd. The voltage VMout0 is suddenly reduced to 0 [V] in time t42, and holds 0 [V] until reaching time t51.

The voltage VMout1 of the terminal Mout1 becomes (−Vf) from time t41 to time t42, and is gently increased to a predetermined value and then reduced by the back electromotive force voltage of the motor 120 after time t42, so that the voltage becomes 0 [V] again in time t51.

Figure 7:
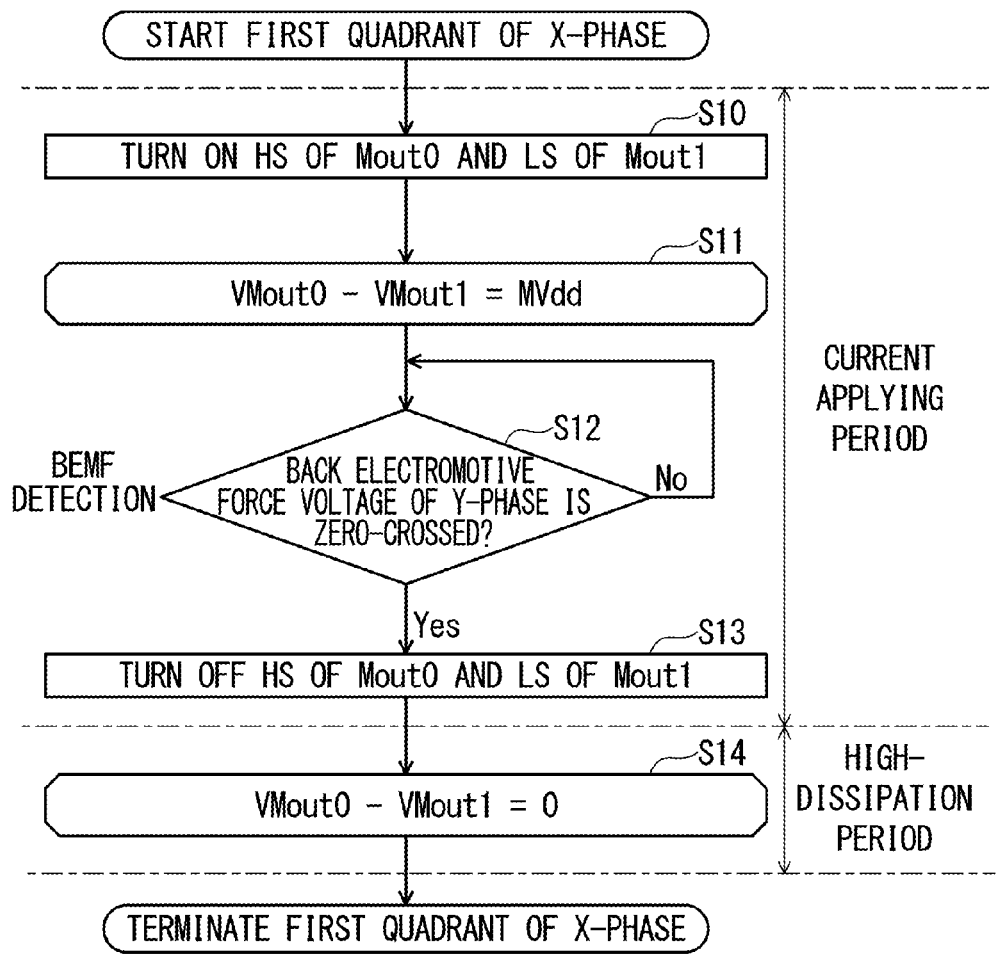
FIG. 7 is a flowchart illustrating the processing of a first quadrant of the X phase of the apparatus for controlling the drive of the motor according to the first embodiment.

FIG. 7 is a flowchart illustrating the processing of the first quadrant of the X phase of the apparatus for controlling the drive of the motor according to the first embodiment. This is the same as the flowchart of the comparative example in FIG. 11, but is different in Y-phase operation mode.

The X phase starts the first quadrant from the current applying period. The bridge control circuit 110 turns on the high-side switching element 6 of the leg on the terminal Mout0 and the low-side switching element 4 of the leg on the terminal Mout1, in the H-bridge circuit 20X of the X phase (step S10). Thus, the H-bridge circuit 20X of the X phase performs current application in the first quadrant. At this time, a difference between the voltage VMout0 and the voltage VMout1 becomes the power voltage MVdd (step S11). Current flows from the terminal Mout0 to the terminal Mout1, so that the motor 120 is rotated and the absolute value of the coil current IMX is gradually increased.

Here, if the back electromotive force voltage VMY of the Y-phase is zero-crossed (Yes in step S12), the high-side switching element 6 of the leg on the terminal Mout0 of the X phase and the low-side switching element 4 of the leg on the terminal Mout1 thereof are turned off (step S13), the X phase is shifted to the high-dissipation period. Thereby, the voltage VMout0 becomes equal to the voltage VMout1 (step S14), so that the first quadrant is terminated.

In the first quadrant, the H-bridge circuit 20Y of the Y phase takes a voltage waveform where the flyback voltage and the back electromotive force voltage are cancelled from each other. In an initial stage of the first quadrant, the back electromotive force voltage is generated by the rotation of the motor. However, simultaneously, because all the switching elements are turned off in a last stage of a preceding fourth quadrant, the flyback voltage is induced by the coil 124Y in a direction opposite to that of the preceding current application and then a shift to the high-dissipation period is performed. By this flyback voltage, the voltage VMout2 becomes equal to or more than the power voltage MVdd, and the voltage VMout3 becomes equal to or less than the voltage drop Vf in the diode's forward direction. Thus, a DC path is formed to cause current to flow from the ground 142 through the coil 124Y to the DC power 140.

Thereafter, if a predetermined period has passed, the H-bridge circuit 20Y transfers the high-side switching element in the direction of the coil current IMY to the low-dissipation mode as the conduction state. The current path is formed to cause current to flow from the ground 142 through the coil 124Y to the DC power source 140, so that the absolute value of the coil current IMY is decreased until it becomes 0 [mA] and the flyback voltage is cancelled. The H-bridge circuit 20Y of the Y phase is shifted to the free period by cancelling the flyback voltage. Therefore, the back electromotive force voltage appears between the terminal Mout2 and the terminal Mout3, by the rotation of the motor. When the back electromotive force voltage VMY of the Y phase is zero-crossed, the step S12 is performed and the first quadrant is terminated.

FIG. 8 is a flowchart illustrating the processing of the second quadrant of the X phase of the apparatus for controlling the drive of the motor according to the first embodiment.

In the second quadrant, the H-bridge circuit 20X of the X phase takes a voltage waveform where the flyback voltage and the back electromotive force voltage are cancelled from each other. In an initial stage of the second quadrant, the back electromotive force voltage is generated by the rotation of the motor. However, simultaneously, because all the switching elements 2, 4, 6 and 8 are turned off in a last stage of a preceding first quadrant, the flyback voltage is induced in a direction opposite to that of the preceding current application and then a shift to the high-dissipation period is performed.

In the initial stage of the second quadrant, the H-bridge circuit 20X of the X phase has the voltage VMout0 and the voltage VMout1 which are equal to each other (step S20). Subsequently, energy accumulated in the coil 124X is released, and the flyback voltage is induced in the terminal Mout0 (step S21).

If a predetermined time has elapsed, the X-phase flyback voltage causes the voltage VMout0 to be equal to or more than the power voltage MVdd, and causes the voltage VMout1 to be equal to or less than the voltage drop Vf in the forward direction of the diode 18 (step S22). Thus, the current path is formed to cause current to flow from the ground 142 through the diode 18, the coil 124X and the diode 12 back to the DC power source 140.

The bridge control circuit 110 turns on the high-side switching element 2 of the leg on the terminal Mout1 (step S23), and shift to the flyback period. In the flyback period, the current path is formed to cause current to flow from the ground 142 through the diode 18, the coil 124X and the switching element 2 back to the DC power source 140, and the coil current IMX is decreased at high speed until it becomes 0 [mA]. This is referred to as the low-dissipation mode and is lower in dissipation than the high-dissipation mode.

In the flyback period, the bridge control circuit 110 periodically obtains the X-phase voltage VMX from the A/D converter 117. If the voltage VMX is less than the sum of the power voltage MVdd and the voltage drop Vf in the forward direction of the diode 18 (Yes in step S24), the bridge control circuit 110 turns off the high-side switching element 2 of the terminal Mout1 (step S25) and the shift to the free period is performed.

In the free period, the bridge control circuit 110 initially attempts to detect the zero-cross of the flyback voltage induced in the voltage VMX in the BEMF detector 118 (step S26). If the flyback voltage were zero-crossed (Yes in step S26), the flyback is cancelled and the back electromotive force voltage is generated between the terminal Mout0 and the terminal Mout1 (step S27). The bridge control circuit 110 further attempts to detect the zero-cross of the back electromotive force voltage appearing in the voltage VMX by the BEMF detector 118 (step S28). If the back electromotive force voltage were zero-crossed (Yes in step S28), the second quadrant is terminated.

The bridge control circuit 110 turns on the high-side switching element 2 of the terminal Mout1 (step S23), so that it is operated in the low-dissipation mode that is lower in dissipation than the high-dissipation mode. Therefore, it is possible to reduce the power dissipation. Further, if the voltage VMX is less than the sum of the power voltage MVdd and the voltage drop Vf in the forward direction of the diode 18, the bridge control circuit 110 turns off the high-side switching element 2 of the terminal Mout1 and terminates the low-dissipation mode. Therefore, there is nothing that affects the measurement of the back electromotive force voltage and the detection of the stall of synchronism after the flyback pulse is terminated, and the brake does not occur for the motor 120.

In the second quadrant, the Y-phase H-bridge circuit 20Y performs an operation to the X-phase operation mode of FIG. 7. That is, the H-bridge circuit 20Y of the Y phase turns on the high-side switching element of the leg on the terminal Mout2 and the low-side switching element of the leg on the terminal Mout3 (corresponding to step S10 of FIG. 7) and applies current. A difference between the voltage VMout2 and the voltage VMout3 becomes the voltage MVdd (corresponding to step S11 of FIG. 7). At this time, current flows from the terminal Mout2 to the terminal Mout3, so that the motor 120 rotates and the absolute value of the coil current IMY gradually increases.

Here, if the back electromotive force voltage VMX of the X-phase is zero-crossed (corresponding to Yes in step S12 of FIG. 7), the high-side switching element of the leg on the terminal Mout2 of the Y phase and the low-side switching element of the leg on the terminal Mout3 thereof are turned off (corresponding to step S13 of FIG. 7), and the Y phase is shifted to the high-dissipation period. The voltage VMout2 of the Y phase momentarily becomes equal to the voltage VMout3 (corresponding to step S14 of FIG. 7), so that the second quadrant is terminated.

In the first embodiment, since the A/D converter 117 for detecting the stall of synchronism is useful to detect the termination of the flyback, this may be implemented without increasing cost. Even if the power voltage MVdd, the load torque or the rotating speed is changed, the power dissipation or the brake does not occur.

According to the first embodiment, it is possible to detect a timing of terminating the flyback pulse and to turn the switching element off in this timing. Therefore, there is nothing that affects the measurement of the back electromotive force voltage and the detection of the stall of synchronism after the flyback pulse is terminated. Further, since the brake does not occur for the motor 120, there is nothing that adversely affects the performance of the motor at the maximum speed.

Figure 13:
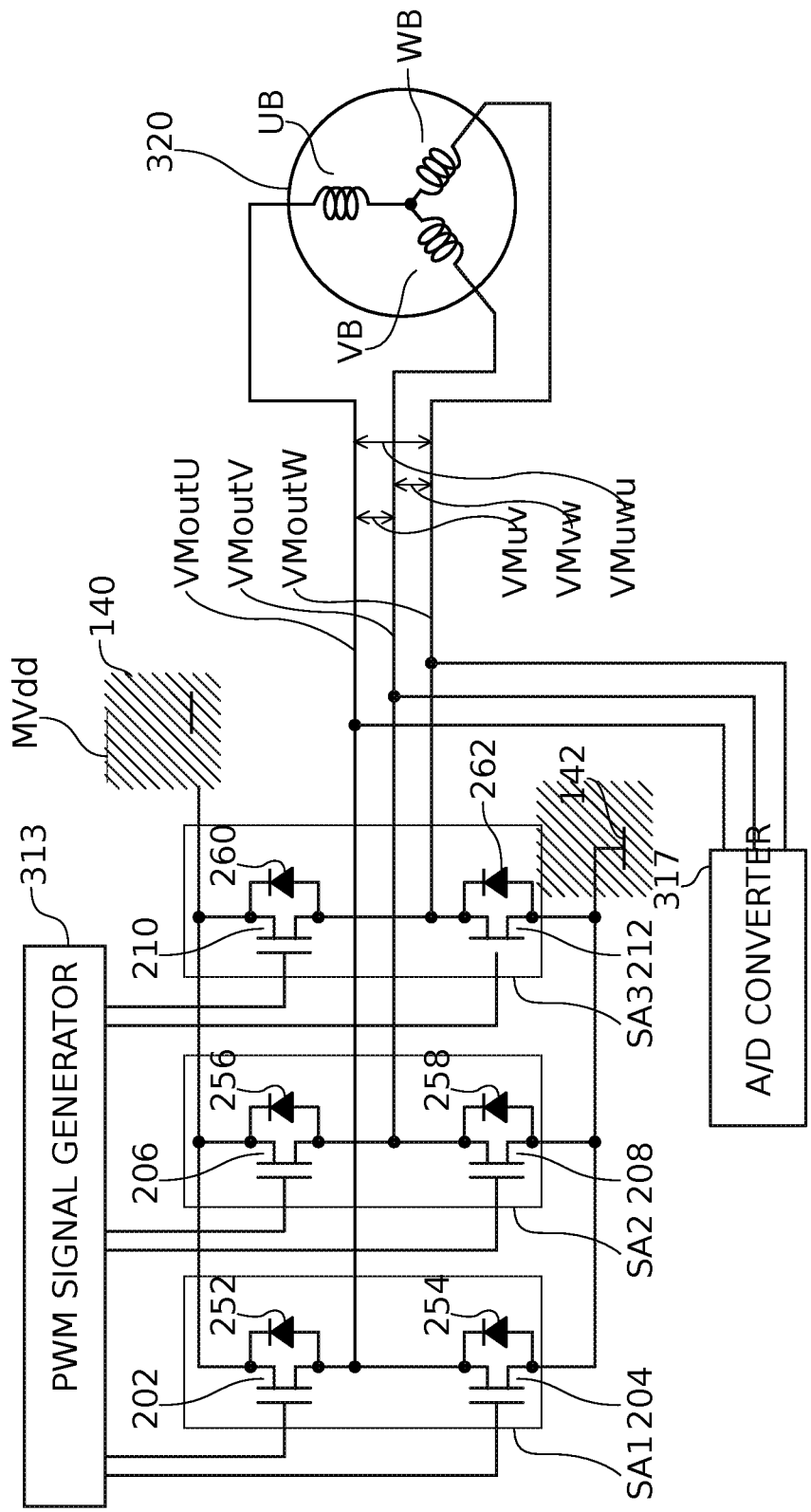
FIG. 13 is a detailed view illustrating a coil, a switching element and a peripheral part of a motor controller according to a second embodiment.

Next, for example, the use of the present invention will be described in the case where a motor coil forms a star connection in a brushless motor. FIG. 13 is a detailed view illustrating a coil, a switching element and a peripheral part of a motor controller according to a second embodiment.

Switching elements 202 and 204 form a series circuit SA1. Likewise, switching elements 206 and 208 form a series circuit SA2, and switching elements 210 and 212 form a series circuit SA3.

A DC power source 140 and a ground 142 are connected to the series circuits SA1 to SA3 to apply a predetermined power voltage MVdd thereto. Diodes 252, 254, 256, 258,

260 and 262 are diodes (fly-wheel diodes) for return current, and are connected in parallel to the switching elements 202, 204, 206, 208, 210 and 212, respectively. A PWM signal generator 313 corresponds to the PWM signal generator 113 of the first embodiment to be connected to a bridge controller (not shown). The PWM signal generator 313 is based on the control by the bridge controller (not shown) and generates a switching signal to be supplied to the switching elements of the series circuits SA1 to SA3. Here, the switching signal is an on/off signal that is applied to each switching element as gate voltage. In the drawings, a lower terminal of each of the switching elements 202, 204, 206, 208, 210 and 212 becomes a source terminal, while an upper terminal thereof becomes a drain terminal. Voltages VMoutU, VMoutV and VMoutW are supplied to an A/D converter 317 and a BEMF (back electromotive force voltage) detector (not shown). The A/D converter 317 of the second embodiment is used as a voltage detector for detecting a differential voltage of the motor coil, as in the first embodiment.

The voltage VMoutU at a connecting point of the switching elements 202 and 204, the voltage VMoutV at a connecting point of the switching elements 206 and 208, and the voltage VMoutW at a connecting point of the switching elements 210 and 212 are applied to one ends of the coils UB, VB and WB of the motor 320, respectively. The other ends of the coils UB, VB and WB are connected to each other in a star form.

In the case of applying the voltages VMoutU and VMoutV by the series circuits SA1 and SA2, a motor voltage VMuv (=voltage VMoutU−VMoutV) that is a difference between the voltages VMoutU and VMoutV is applied to the coils UB and VB connected in series. Here, the respective series circuits SA1 and SA2 and the coils UB and VB connected in series thereto form half bridge circuits, and the half bridge circuits form an H bridge circuit.

In the case of applying the voltages VMoutV and VMoutW by the series circuits SA2 and SA3, a motor voltage VMvw (=voltage VMoutV−VMoutW) that is a difference between the voltages VMoutV and VMoutW is applied to the coils VB and WB connected in series. Likewise, the respective series circuits SA2 and SA3 and the coils VB and WB connected in series thereto form half bridge circuits, and the half bridge circuits form an H bridge circuit.

Likewise, in the case of applying the voltages VMoutW and VMoutU by the series circuits SA3 and SA1, a motor voltage VMwu (=voltage VMoutW−VMoutU) that is a difference between the voltages VMoutW and VMoutU is applied to the coils WB and UB connected in series. Further, the respective series circuits SA3 and SA1 and the coils WB and UB connected in series thereto form half bridge circuits, and the half bridge circuits form an H bridge circuit.

As such, in the case of the star connection, the application of the voltages to the coils is selectively changed in sequence, but the H bridge circuit is formed by two half bridge circuits using any of the series circuits SA1 to SA3 depending on the combination of coils to which voltage is to be applied. As in the first embodiment, a drive control may be performed on any H bridge circuit formed by combining the half bridge circuits with each other. Therefore, it is possible to achieve the same effect as the first embodiment.

In the foregoing first embodiment, the formation of two groups of switch circuits and coils is always the same. However, the H bridge circuit formed as such may also be regarded as a kind of H bridge circuit made by combining the half bridge circuits with each other.

The present invention is not limited to the above-mentioned embodiments and may be modified without departing from the gist thereof. For example, the following modifications (a) to (h) are possible.

(a) The present invention is not limited to a two-phase step motor and may use any phase of motor, e.g. a three-phase step motor. Further, a brushless motor whose motor coil is a delta connection may be used.

(b) The switching element is not limited to the MOSFET, and may be any kind of semiconductor switch element.

(c) At least some of respective components of the motor controller may be processed not by hardware but by software.

(d) At least a part of the motor controller may be an integrated circuit (IC).

(e) The circuit block configuration of the motor controller shown in FIGS. 1 and 2 is the specific example and is not limited thereto.

(f) The control flow shown in FIGS. 7 and 8 is one example, and is not limited to these steps, for example, other steps may be inserted between the steps.

(g) The transfer from the high-dissipation mode to the low-dissipation mode is not limited to the elapse of a predetermined time, and may be performed by the zero-cross of the flyback voltage.

(h) While the shift is performed from the high-dissipation period when all switching elements are turned off to the flyback period when the high-side switching element is turned on, as in the variant of FIG. 4, a period may be provided to turn on the high-side switching element of one leg and the low-side switching element of the other leg.

As described with reference to the embodiments, according to the present invention, there are provided a motor controller and a method for controlling a motor having capability to allow the current discharged to the ground to return to the power source, thus making it possible to reduce the power dissipation.

What is claimed is:

1. A motor controller comprising:
    an H bridge circuit having switching elements, fly-wheel diodes, and half bridges connected to motor coils provided in the motor;
    a voltage detector that detects a differential voltage between the motor coils;
    a zero-cross detector that detects a zero-cross of a back electromotive force voltage of each of the motor coils; and
    a controller that operates to control the H bridge circuit to operate in one of operation modes including a charge mode, a high-dissipation mode, a low-dissipation mode and a free mode by activating the switching elements of the H bridge based on the differential voltage detected by the voltage detector,
    wherein the H bridge circuit increases a motor current flowing in each of the motor coils in the charge mode,
    wherein the H bridge circuit operates with high energy dissipation and a flyback pulse of each of the motor coils is induced in the high-dissipation mode,
    wherein the H bridge circuit operates with low energy dissipation that is lower than in the high-dissipation mode in the low-dissipation mode,
    wherein the H bridge circuit operates to allow the zero-cross detector to detect the zero-cross of the back electromotive force voltage of each of the motor coils after the flyback pulse of each of the motor coils is decreased, wherein the controller further operates to perform a process including:

controlling the H bridge circuit to switch to the charge mode;

controlling the H bridge circuit to switch to the high-dissipation mode when the zero-cross detector detects that the back electromotive force voltage of the motor coil connected to a phase of the H bridge circuit shortly before the H bridge circuit is zero-crossed;

controlling the H bridge circuit to switch to the low-dissipation mode after a predetermined time has elapsed; and controlling the H bridge circuit to switch to the free mode when the voltage detector detects that the differential voltage between the motor coils connected to the H bridge circuit is lower than a predetermined voltage.

2. The motor controller according to claim 1, wherein, in the low-dissipation mode, the controller sets one of the switching elements of the H bridge circuit, which is located on a high side in a direction where the motor current flows, to a conduction state, and causes current to flow in a closed circuit by energy accumulated in the motor coil, the closed circuit being formed by an associated switching element located on the high side that is in the conduction state and a fly-wheel diode located on a low side to be opposite to the direction where the motor current flows.

3. The motor controller according to claim 1, wherein, in the high-dissipation mode, the controller sets all of the switching elements of the H bridge circuit to a non-conduction state, and causes current to flow in a closed circuit by energy accumulated in the motor coil, the closed circuit being formed by a fly-wheel diode of the high side located in the direction where the motor current flows and a fly-wheel diode of the low side located in the direction opposite to that where the motor current flows.

4. The motor controller according to claim 1, wherein the switching elements and the fly-wheel diodes included in the H bridge circuit are of a CMOS type.

5. The motor controller according to claim 1, wherein the voltage detector includes an A/D converter.

6. A method for controlling a motor with a motor controller including:

an H bridge circuit having switching elements, fly-wheel diodes, and half bridges connected to motor coils provided in the motor;

a voltage detector that detects a differential voltage between the motor coils;

a zero-cross detector that detects a zero-cross of a back electromotive force voltage of each of the motor coils; and a controller that operates to control the H bridge circuit to operate in one of operation modes including a charge mode, a high-dissipation mode, a low-dissipation mode and a free mode by activating the switching elements of the H bridge based on the differential voltage detected by the voltage detector, wherein the H bridge circuit increases a motor current flowing in each of the motor coils in the charge mode, wherein the H bridge circuit operates with high energy dissipation and a flyback pulse of each of the motor coils is induced in the high-dissipation mode, wherein the H bridge circuit operates with low energy dissipation that is lower than in the high-dissipation mode in the low-dissipation mode, wherein the H bridge circuit operates to allow the zero-cross detector to detect the zero-cross of the back electromotive force voltage of each of the motor coils after the flyback pulse of each of the motor coils is decreased, wherein the method comprises:

controlling the H bridge circuit to switch to the charge mode;

controlling the H bridge circuit to switch to the high-dissipation mode when the zero-cross detector detects that the back electromotive force voltage of the motor coil connected to a phase of the H bridge circuit shortly before the H bridge circuit is zero-crossed;

controlling the H bridge circuit to switch to the low-dissipation mode after a predetermined time has elapsed; and controlling the H bridge circuit to switch to the free mode when the voltage detector detects that the differential voltage between the motor coils connected to the H bridge circuit is lower than a predetermined voltage.

\* \* \* \* \*